(12) United States Patent
Wieder et al.

(10) Patent No.: US 11,347,373 B2
(45) Date of Patent: May 31, 2022

(54) METHODS AND SYSTEMS TO SAMPLE EVENT MESSAGES

(71) Applicant: VMware, Inc., Palo Alto, CA (US)

(72) Inventors: Udi Wieder, Palo Alto, CA (US);
Dahlia Malkhi, Palo Alto, CA (US);
Eric Schkufza, Palo Alto, CA (US);
Mayank Agarwal, Seattle, WA (US);
Nicholas Kushmerick, Seattle, WA (US); Ramses Morales, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 662 days.

(21) Appl. No.: 15/286,366

(22) Filed: Oct. 5, 2016

(65) Prior Publication Data
US 2018/0095610 A1    Apr. 5, 2018

(51) Int. Cl.
*G06F 3/0482*  (2013.01)
*G06F 3/04855* (2022.01)
*G06F 16/188*  (2019.01)

(52) U.S. Cl.
CPC ........ *G06F 3/0482* (2013.01); *G06F 3/04855* (2013.01); *G06F 16/188* (2019.01)

(58) Field of Classification Search
CPC ............. G06F 17/30233; G06F 3/0482; G06F 3/04855; G06F 16/188
See application file for complete search history.

(56) References Cited

U.S. PATENT DOCUMENTS

| | | | | |
|---|---|---|---|---|
| 6,792,456 | B1* | 9/2004 | Hellerstein | G06F 11/0709 709/224 |
| 6,988,208 | B2* | 1/2006 | Hrabik | H04L 63/1416 709/208 |
| 7,647,398 | B1* | 1/2010 | Fan | G06F 21/552 709/206 |
| 8,180,883 | B1* | 5/2012 | Clemm | H04L 41/0631 709/223 |
| 8,839,435 | B1* | 9/2014 | King | H04L 63/1425 726/22 |
| 10,216,862 | B1* | 2/2019 | Shrigondekar | G06F 16/254 |
| 2003/0229559 | A1* | 12/2003 | Panttaja | G06Q 10/08 705/36 R |
| 2004/0002958 | A1* | 1/2004 | Seshadri | G06F 17/30867 |
| 2004/0125798 | A1* | 7/2004 | Hondo | H04L 29/06 370/389 |
| 2004/0133672 | A1* | 7/2004 | Bhattacharya | H04L 63/1416 709/224 |
| 2006/0271592 | A1* | 11/2006 | Selkirk | G06F 8/65 |
| 2008/0098125 | A1* | 4/2008 | Wang Baldonado | G06Q 10/107 709/231 |

(Continued)

*Primary Examiner* — Alford W Kindred
*Assistant Examiner* — Tiffany Thuy Bui

(57) ABSTRACT

Methods and systems to sample event messages are described. As event messages are generated by one or more sources, the event messages are stored in a storage queue. An event message policy that represents conditions for storing event messages in a sample log file are input. For each event message output from the storage queue, the event message may be stored in a sample log file when one or more of the conditions of the event message policy are satisfied. The event messages of the sample log file may be displayed in a graphical user interface that enables a user to change the event message policy.

15 Claims, 34 Drawing Sheets

(56) References Cited

U.S. PATENT DOCUMENTS

| | | | | |
|---|---|---|---|---|
| 2010/0122270 A1* | 5/2010 | Lin | ............... | G06F 21/552 |
| | | | | 719/318 |
| 2010/0180158 A1* | 7/2010 | Corry | ............... | G06F 11/3419 |
| | | | | 714/38.14 |
| 2011/0185234 A1* | 7/2011 | Cohen | ............... | G06F 11/3476 |
| | | | | 714/37 |
| 2012/0203794 A1* | 8/2012 | Zhang | ............... | G06F 16/22 |
| | | | | 707/769 |
| 2013/0080367 A1* | 3/2013 | Tonouchi | ............... | G06N 5/02 |
| | | | | 706/46 |
| 2014/0005809 A1* | 1/2014 | Frei | ............... | H04L 29/1249 |
| | | | | 700/90 |
| 2014/0334739 A1* | 11/2014 | Umanesan | ............... | G06F 17/3071 |
| | | | | 382/200 |
| 2015/0199710 A1* | 7/2015 | Bell | ............... | G06Q 30/0242 |
| | | | | 705/14.41 |
| 2016/0196174 A1* | 7/2016 | Jacob | ............... | G06F 11/0781 |
| | | | | 714/37 |
| 2016/0261541 A1* | 9/2016 | Samuni | ............... | G06F 11/0706 |
| 2016/0379276 A1* | 12/2016 | Ruggiero | ............... | G06Q 10/06 |
| | | | | 705/14.71 |
| 2017/0063946 A1* | 3/2017 | Quan | ............... | H04L 67/20 |
| 2017/0230324 A1* | 8/2017 | Seigel | ............... | H04L 51/26 |
| 2017/0300401 A1* | 10/2017 | K | ............... | G06F 11/0706 |
| 2018/0165554 A1* | 6/2018 | Zhang | ............... | G06N 3/04 |

* cited by examiner

```
log.write([$Time_date] [Thread-$X/$IP/INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[$Time_date] Repair session $RS for range $range finished)
```

FIG. 13

```
[2015-03-10 23:43:36.859+0000] [Thread-1822496/127.0.0.1 INFO]
[com.vmware.loginsight.commons.executor.ProcessExecutor] [ [[/usr/lib/loginsight/application/
lib/apache-cassandra-2.0.10/bin/nodetool, -h, montools-prod-loginsight.vmware.com, repair]]
[2015-03-10 23:43:36,716] Repair session 51312720-c77e-11e4-ad72-4769d614a3f2 for range
(-6899937477723537626, -6896547230076663429) finished]
```

FIG. 14

```
                                    . ·
                       1608   1610  .           1602
                                    .
  ┌─────────────────────────────────────────────┐
  │ 2013-12-02T10:44:24.095Z li-qe-esx5.vmware.com Rhttpproxy:  │──1604
  │ [28959B90 verbose 'Proxy Req 46691'] Connected to           │
  │ localhost:8307──1612                       ──1606           │
  ├─────────────────────────────────────────────┤
  │ 2013-12-02T10:44:24.094Z li-qe-esx5.vmware.com Rhttpproxy:  │
  │ [FFFC2B90 verbose 'Proxy Req 46691'] new proxy client       │
  │ TCP (local=127.0.0.1:80, peer=127.0.0.1:50155)              │
  ├─────────────────────────────────────────────┤
  │ 2013-12-02T10:44:24.093Z li-qe-esx5.vmware.com Rhttpproxy:  │
  │ [2889B90 verbose 'Proxy Req 46685'] The client closed the   │
  │ stream, not unexpectedly.                                   │
  ├─────────────────────────────────────────────┤
  │ Dec  2 18:48:29 strata-vc 2013-12-02T18:48:30.273Z          │
  │ [7FA39448B700 info 'commonvpxLro' opID=1947d6f9]  [VpxLRO] -│
  │ FINISH task-internal-2163522 -- -- vim.SessionManager.logout -│
  ├─────────────────────────────────────────────┤
  │ 2013-12-02T18:48:51.396Z strata-esx1.eng.vmware.com Vpxa:   │
  │ [65B5AB90 verbose 'VpxaHalCnxHostagent' opID=WFU-ed393333]  │
  │ [WaitForUpdatesDone] Completed callback                     │
  ├─────────────────────────────────────────────┤
  │ 2013-12-02T18:48:51.395Z strata-esx1.eng.vmware.com Vpxa:   │
  │ [65B5AB90 verbose 'VpxaHalCnxHostagent' opID=WFU-ed393333]  │
  │ [WaitForUpdatesDone] Starting next WaitForUpdates() call to │
  │ hostd                                                       │
  ├─────────────────────────────────────────────┤
  │ 2013-12-02T18:48:51.395Z strata-esx1.eng.vmware.com Vpxa:   │
  │ [65B5AB90 verbose 'vpxavpxaInvtVm' opID=WFU-ed393333]       │
  │ [VpxaInvtVmChangeListener] Guest DiskInfo Changed           │
  ├─────────────────────────────────────────────┤
  │ 2013-12-02T18:48:51.395Z strata-esx1.eng.vmware.com Vpxa:   │
  │ [65B5AB90 verbose 'vpxavpxaInvtVm' opID=WFU-ed393333]       │
  │ [VpxaInvtVmChangeListener] Guest DiskInfo Changed           │
  └─────────────────────────────────────────────┘
                                    .
                                    .
                                    .

FIG. 16
```

| Count | Event types |
|---|---|
| 10.5K | 2013-12-02T10:44:24.095Z li-qe-esx5.vmware.com Rhttpproxy: [28959B90 verbose 'Proxy Req 46691'] Connected to localhost:8307 |
| 8K | 2013-12-02T10:44:24.094Z li-qe-esx5.vmware.com Rhttpproxy: [FFFC2B90 verbose 'Proxy Req 46691'] new proxy client TCP (local=127.0.0.1:80, peer=127.0.0.1:50155) |
| 6K | 2013-12-02T10:44:24.093Z li-qe-esx5.vmware.com Rhttpproxy: [2889B90 verbose 'Proxy Req 46685'] The client closed the stream, not unexpectedly. |
| 5.8K | Dec 2 18:48:29 strata-vc 2013-12-02T18:48:30.273Z [7FA39448B700 info 'commonvpxLro' opID=1947d6f9] [VpxLRO] -- FINISH task-internal-2163522 -- -- vim.SessionManager.logout -- |
| 3.2K | 2013-12-02T18:48:51.396Z strata-esx1.eng.vmware.com Vpxa: [65B5AB90 verbose 'VpxaHalCnxHostagent' opID=WFU-ed393333] [WaitForUpdatesDone] Completed callback |

Create sample log file — 1810, 1812

Set general policy

Set policy based on event type

FIG. 18A

| Event message policy | |
|---|---|
| Event types | Sample rate(%) |
| Error | 100% |
| Failure | 100% |
| High CPU | 60% |
| High memory | 50% |
| Login | 7% |
| Unspecified | 30% |
| ... | ... |

FIG. 21

METHODS AND SYSTEMS TO SAMPLE EVENT MESSAGES

TECHNICAL FIELD

The present disclosure is directed to sample event messages based on event messages policies set by a user and store the sampled event messages in a separate sample log file.

BACKGROUND

During the past seven decades, electronic computing has evolved from primitive, vacuum-tube-based computer systems, initially developed during the 1940s, to modern electronic computing systems in which large numbers of multi-processor server computers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies. It is often a challenging task for system administrators, system designers and developers, and system users to identify information within the enormous event logs generated in distributed computing systems relevant to detecting and diagnosing operational anomalies and useful in administering, managing, and maintaining distributed computer systems.

SUMMARY

Methods and systems to sample event messages are described. As event messages are generated by one or more sources, the event messages are stored in a storage queue. An event message policy that represents conditions for storing event messages in a sample log file are input. For each event message output from the storage queue, one or more conditions for storing the event message in the sample log file are determined based on the event message policy. The event message may be stored in the sample log file when one or more of the conditions for storing the event messages to the sample log file are satisfied. The event messages of the sample log file may be displayed in a graphical user interface that enables a user to change the event message policy.

DESCRIPTION OF THE DRAWINGS

FIG. 13 shows an example of a log write instruction.

FIG. 14 shows an example of an event message generated by the log write instruction of FIG. 13.

FIG. 16 shows a small, eight-entry portion of an event-log file.

FIG. 18A-18B show a graphical user interface ("GUI") that may be used to determine how event messages are to be sampled.

FIG. 21 displays a GUI shown in FIGS. 18A-18B used to select sample rates for different event types.

DETAILED DESCRIPTION

Figure 1:
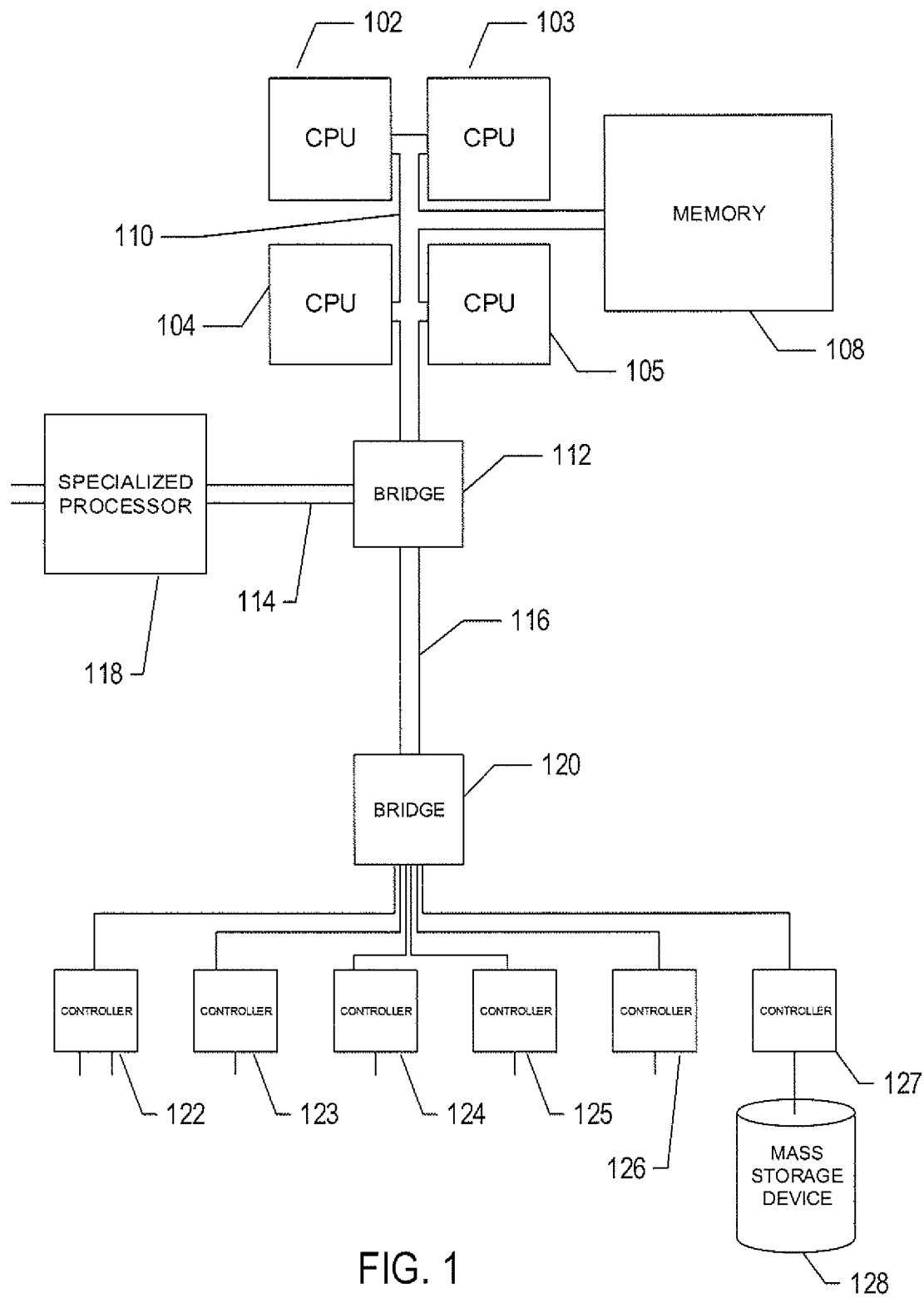
FIG. 1 shows a general architectural diagram for various types of computers.

This disclosure presents computational methods and systems event messages. In a first subsection, computer hardware, complex computational systems, and virtualization are described. Methods and systems to sample event messages are described below in a second subsection.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 shows a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational devices. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
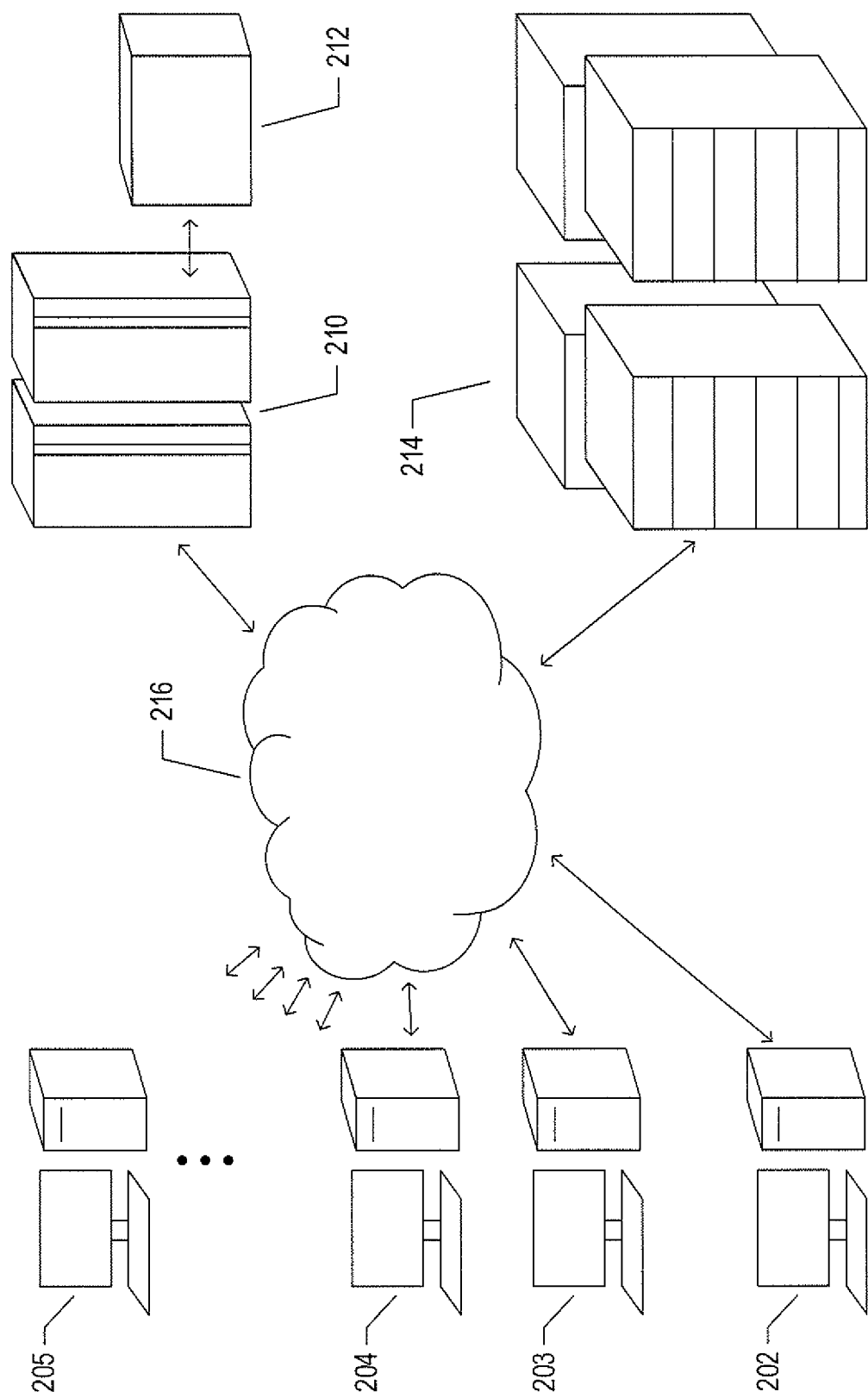
FIG. 2 shows an Internet-connected distributed computer system.

FIG. 2 shows an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
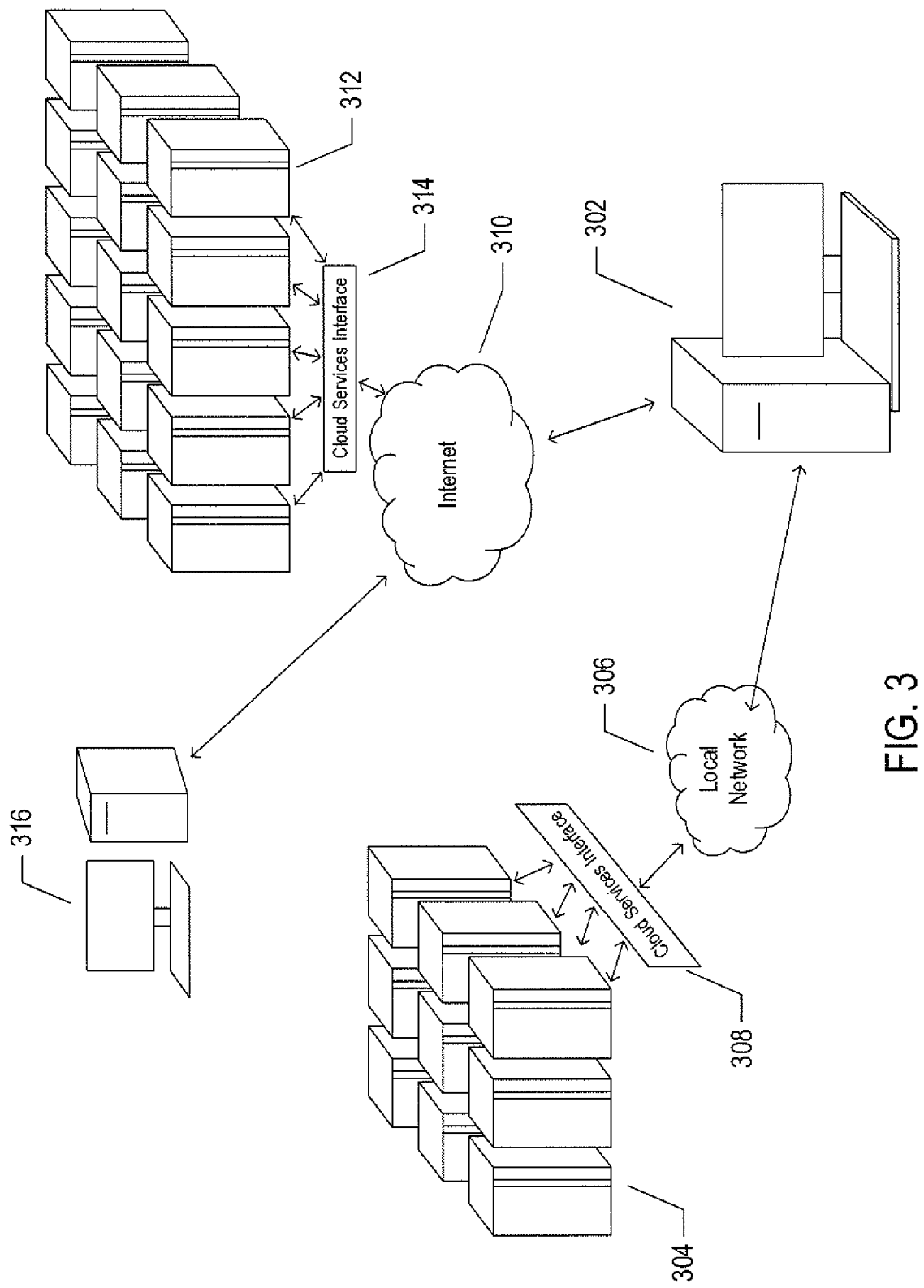
FIG. 3 shows cloud computing.

FIG. 3 shows cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the devices to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
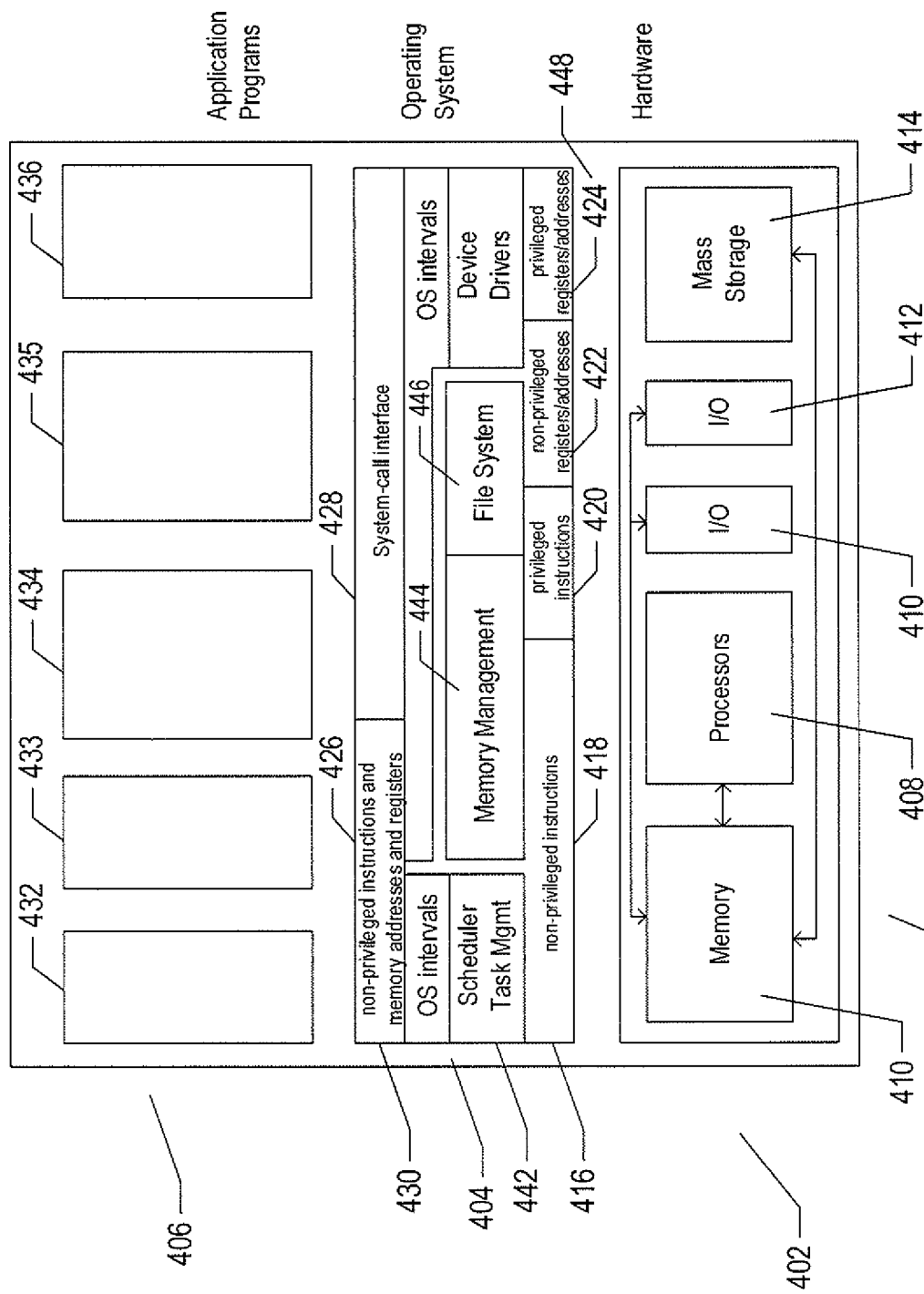
FIG. 4 shows generalized hardware and software components of a general-purpose computer system.

FIG. 4 shows generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor devices and other system devices with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 446 facilitates abstraction of mass-storage-device and memory devices as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
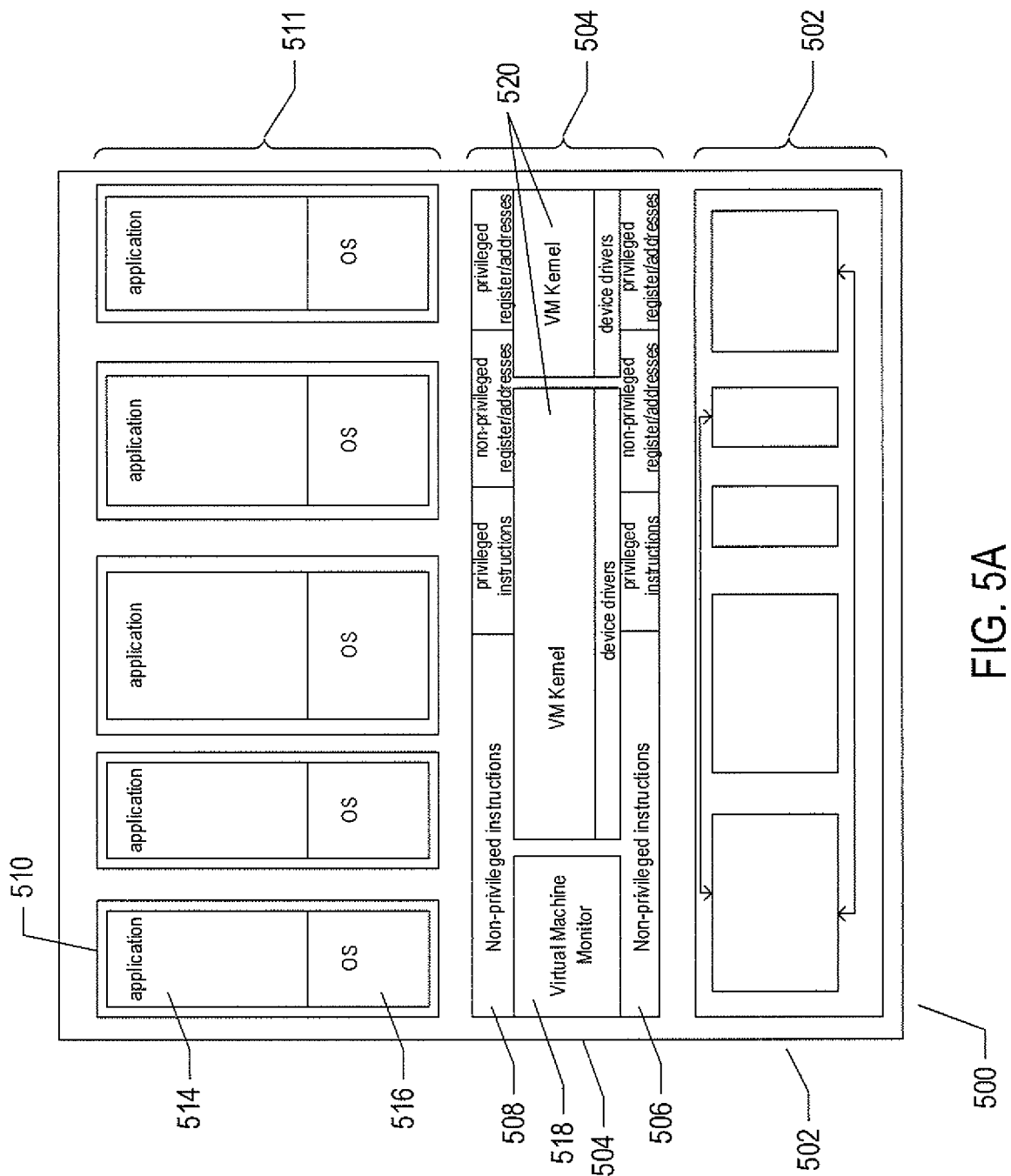
FIGS. 5A-5B show two types of virtual machine and virtual-machine execution environments.
Figure 5B:
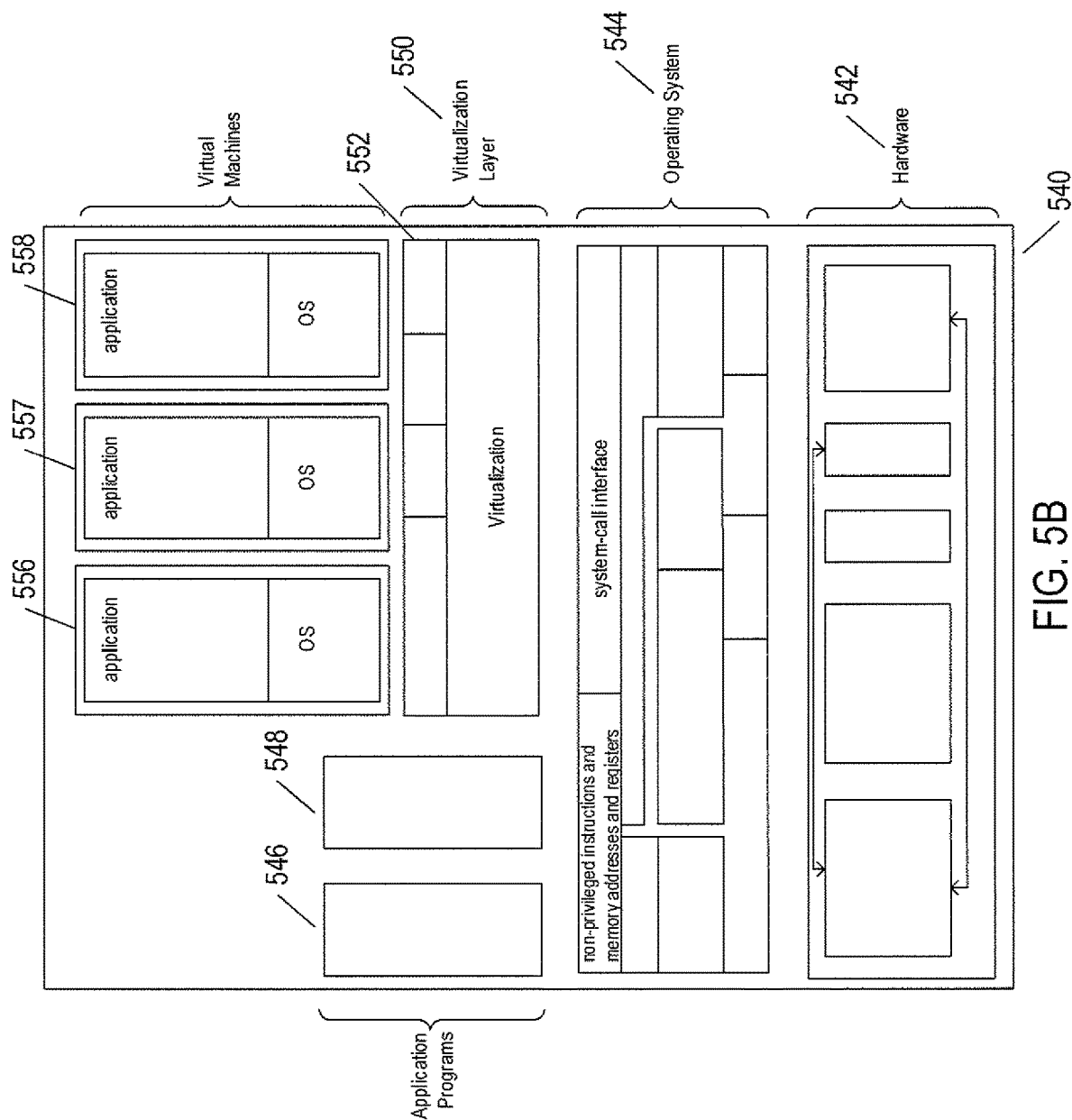

For all of these reasons, a higher level of abstraction, referred to as the "virtual machine," ("VM") has been developed and evolved to further abstract computer hardware in order to address many difficulties and challenges associated with traditional computing systems, including the compatibility issues discussed above. FIGS. 5A-B show two types of VM and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment shown in FIG. 5A features a virtualization layer 504 that interfaces through a virtualization-layer/hardware-layer interface 506, equivalent to interface 416 in FIG. 4, to the hardware. The virtualization layer 504 provides a hardware-like interface to a number of VMs, such as VM 510, in a virtual-machine layer 511 executing above the virtualization layer 504. Each VM includes one or more application programs or other higher-level computational entities packaged together with an operating system, referred to as a "guest operating system," such as application 514 and guest operating system 516 packaged together within VM 510. Each VM is thus equivalent to the operating-system layer 404 and application-program layer 406 in the general-purpose computer system shown in FIG. 4. Each guest operating system within a VM interfaces to the virtualization layer interface 504 rather than to the actual hardware interface 506. The virtualization layer 504 partitions hardware devices into abstract virtual-hardware layers to which each guest operating system within a VM interfaces. The guest operating systems within the VMs, in general, are unaware of the virtualization layer and operate as if they were directly accessing a true hardware interface. The virtualization layer 504 ensures that each of the VMs currently executing within the virtual environment receive a fair allocation of underlying hardware devices and that all VMs receive sufficient devices to progress in execution. The virtualization layer 504 may differ for different guest operating systems. For example, the virtualization layer is generally able to provide virtual hardware interfaces for a variety of different types of computer hardware. This allows, as one example, a VM that includes a guest operating system designed for a particular computer architecture to run on hardware of a different architecture. The number of VMs need not be equal to the number of physical processors or even a multiple of the number of processors.

The virtualization layer 504 includes a virtual-machine-monitor module 518 ("VMM") that virtualizes physical processors in the hardware layer to create virtual processors on which each of the VMs executes. For execution efficiency, the virtualization layer attempts to allow VMs to directly execute non-privileged instructions and to directly access non-privileged registers and memory. However, when the guest operating system within a VM accesses virtual privileged instructions, virtual privileged registers, and virtual privileged memory through the virtualization layer 504, the accesses result in execution of virtualization-layer code to simulate or emulate the privileged devices. The virtualization layer additionally includes a kernel module 520 that manages memory, communications, and data-storage machine devices on behalf of executing VMs ("VM kernel"). The VM kernel, for example, maintains shadow page tables on each VM so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer 504 essentially schedules execution of VMs much like an operating system schedules execution of application programs, so that the VMs each execute within a complete and fully functional virtual hardware layer.

FIG. 5B shows a second type of virtualization. In FIG. 5B, the computer system 540 includes the same hardware layer 542 and operating system layer 544 as the hardware layer 402 and the operating system layer 404 shown in FIG. 4. Several application programs 546 and 548 are shown running in the execution environment provided by the operating system 544. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The hardware-layer interface 552, equivalent to interface 416 in FIG. 4, provides an execution environment for a number of VMs 556-558, each including one or more application programs or other higher-level computational entities packaged together with a guest operating system.

In FIGS. 5A-5B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
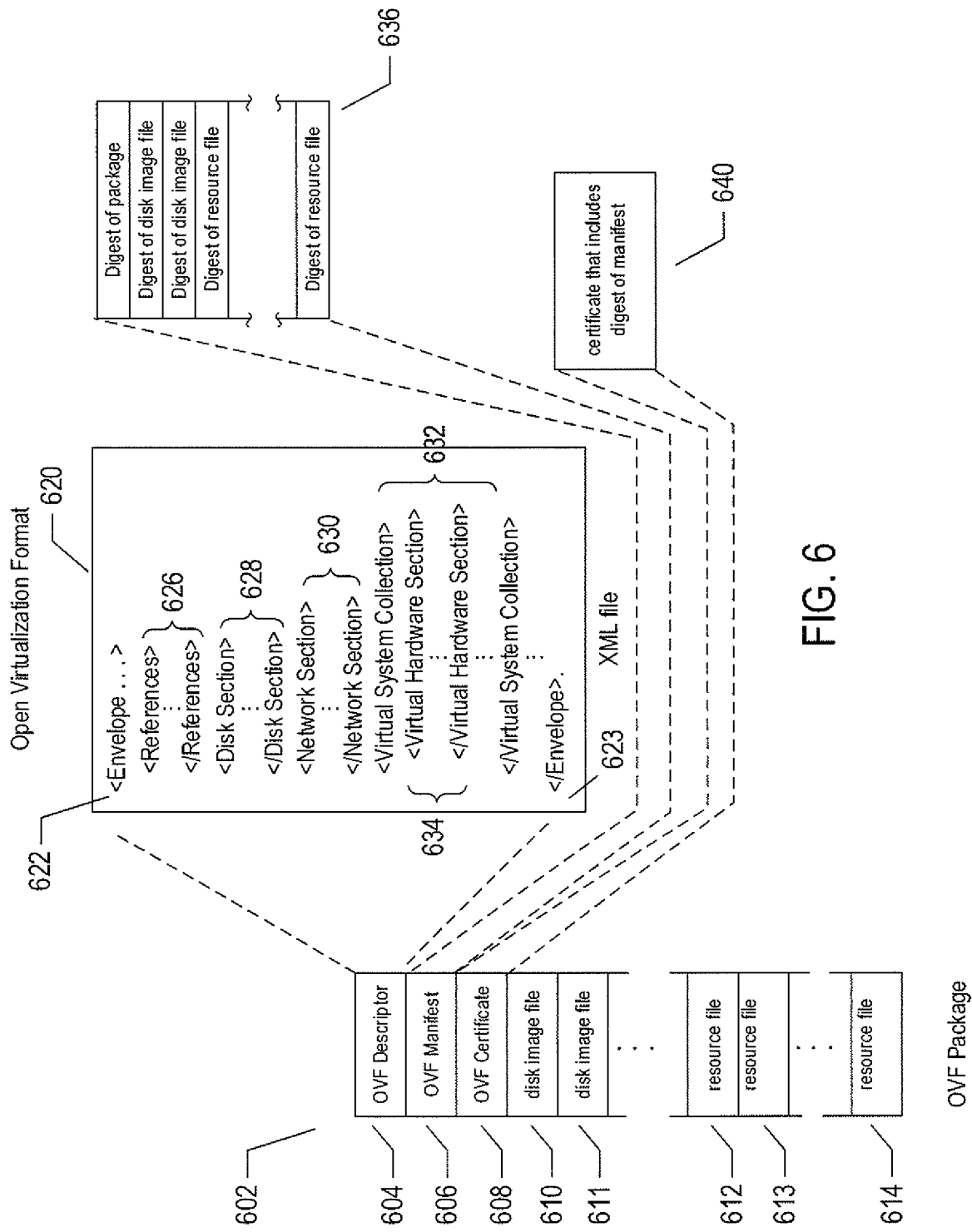
FIG. 6 shows an example of an open virtualization format package.

A VM or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a VM within one or more data files. FIG. 6 shows an OVF package. An OVF package 602 includes an OVF descriptor 604, an OVF manifest 606, an OVF certificate 608, one or more disk-image files 610-611, and one or more device files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each VM 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and device files 612 are digitally encoded content, such as operating-system images. A VM or a collection of VMs encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more VMs that is encoded within an OVF package.

The advent of VMs and virtual environments has alleviated many of the difficulties and challenges associated with traditional general-purpose computing. Machine and operating-system dependencies can be significantly reduced or entirely eliminated by packaging applications and operating systems together as VMs and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers.

Figure 7:
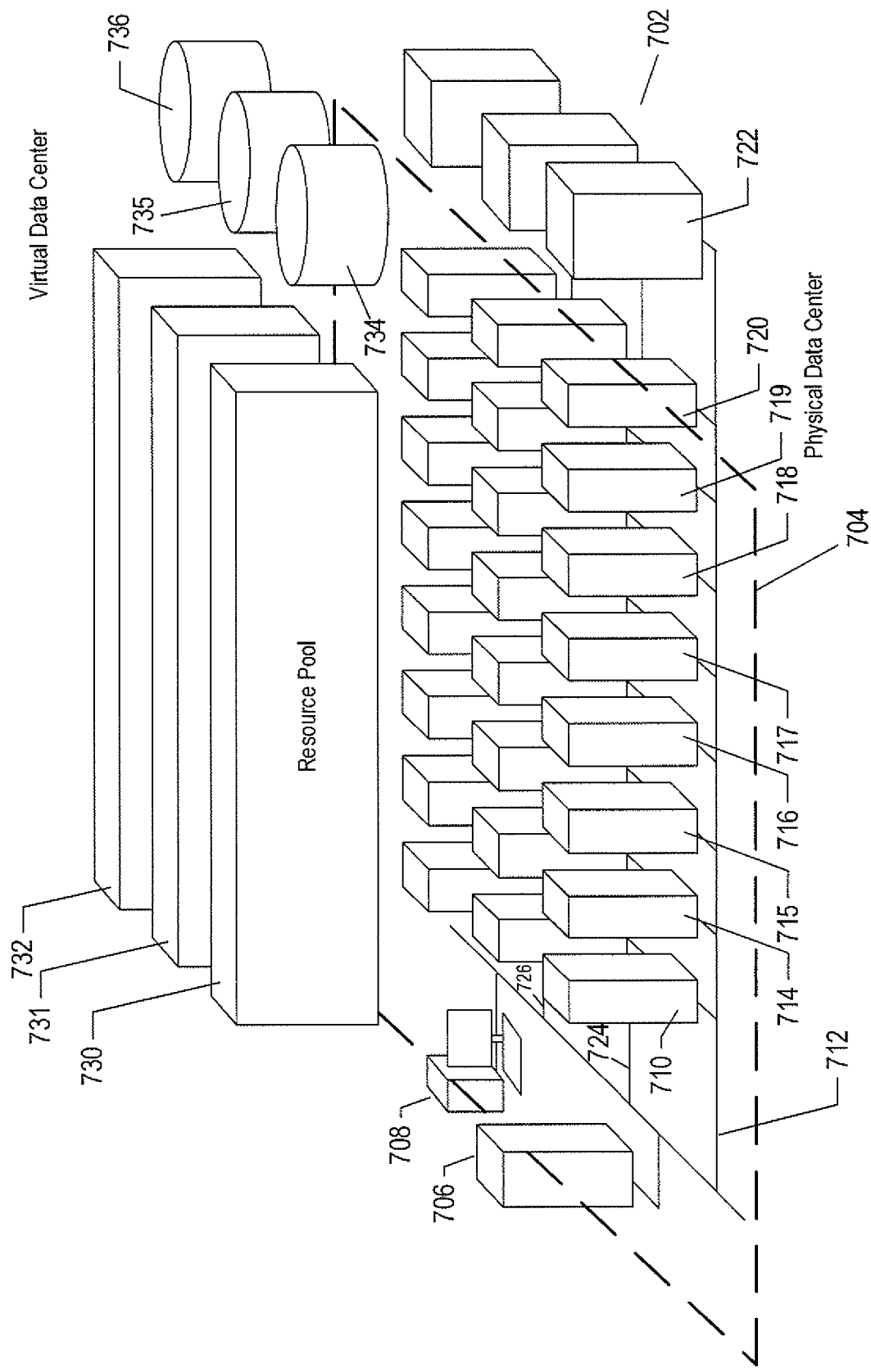
FIG. 7 shows virtual data centers provided as an abstraction of underlying physical-data-center hardware components.

FIG. 7 shows virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple VMs. Different physical data centers may include many different types of computers, networks, data-storage systems and devices connected according to many different types of connection topologies. The virtual-interface plane 704, a logical abstraction layer shown by a plane in FIG. 7, abstracts the physical data center to a virtual data center comprising one or more device pools, such as device pools 730-732, one or more virtual data stores, such as virtual data stores 734-736, and one or more virtual networks. In certain implementations, the device pools abstract banks of physical servers directly interconnected by a local area network.

The virtual-data-center management interface allows provisioning and launching of VMs with respect to device pools, virtual data stores, and virtual networks, so that virtual-data-center administrators need not be concerned with the identities of physical-data-center components used to execute particular VMs. Furthermore, the virtual-data-center management server 706 includes functionality to migrate running VMs from one physical server to another in order to optimally or near optimally manage device allocation, provides fault tolerance, and high availability by migrating VMs to most effectively utilize underlying physical hardware devices, to replace VMs disabled by physical hardware problems and failures, and to ensure that multiple VMs supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of VMs and virtual appliances as well as to provide high-level, distributed functionalities that involve pooling the devices of individual physical servers and migrating VMs among physical servers to achieve load balancing, fault tolerance, and high availability.

Figure 8:
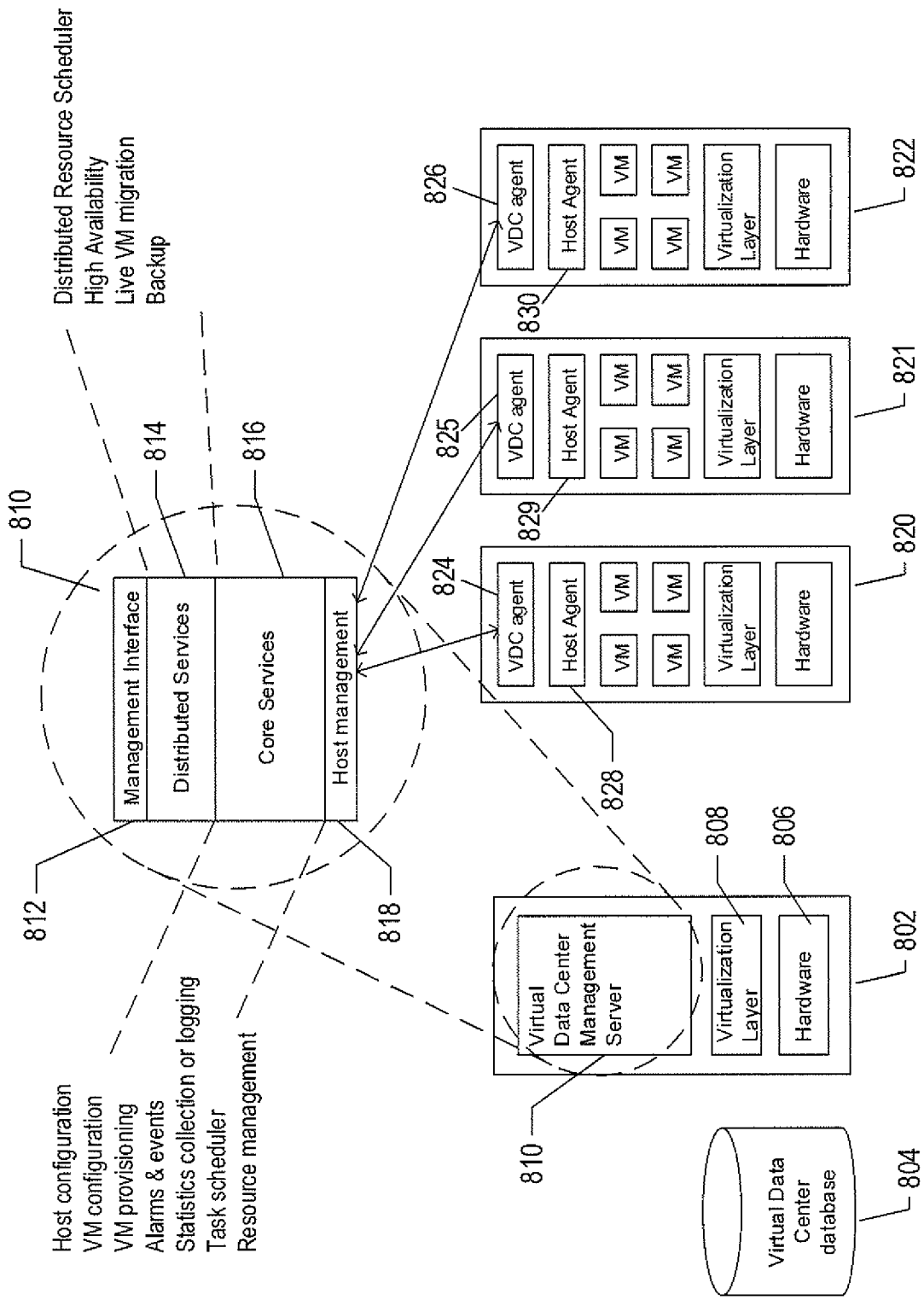
FIG. 8 shows virtual-machine components of a virtual-data-center management server and physical servers of a physical data center.

FIG. 8 shows virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server VM 810 above the virtualization layer. Although shown as a single server in FIG. 8, the virtual-data-center management server ("VDC management server") may include two or more physical server computers that support multiple VDC-management-server virtual appliances. The virtual-data-center management-server VM 810 includes a management-interface component 812, distributed services 814, core services 816, and a host-management interface 818. The host-management interface 818 is accessed from any of various computers, such as the PC 708 shown in FIG. 7. The host-management interface 818 allows the virtual-data-center administrator to configure a virtual data center, provision VMs, collect statistics and view log files for the virtual data center, and to carry out other, similar management tasks. The host-management interface 818 interfaces to virtual-data-center agents 824, 825, and 826 that execute as VMs within each of the physical servers of the physical data center that is abstracted to a virtual data center by the VDC management server.

The distributed services 814 include a distributed-device scheduler that assigns VMs to execute within particular physical servers and that migrates VMs in order to most effectively make use of computational bandwidths, data-storage capacities, and network capacities of the physical data center. The distributed services 814 further include a high-availability service that replicates and migrates VMs in order to ensure that VMs continue to execute despite problems and failures experienced by physical hardware components. The distributed services 814 also include a live-virtual-machine migration service that temporarily halts execution of a VM, encapsulates the VM in an OVF package, transmits the OVF package to a different physical server, and restarts the VM on the different physical server from a virtual-machine state recorded when execution of the VM was halted. The distributed services 814 also include a distributed backup service that provides centralized virtual-machine backup and restore.

The core services 816 provided by the VDC management server VM 810 include host configuration, virtual-machine configuration, virtual-machine provisioning, generation of virtual-data-center alarms and events, ongoing event logging and statistics collection, a task scheduler, and a device-management module. Each physical server 820-822 also includes a host-agent VM 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce device allocations made by the VDC management server VM 810, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational devices of a cloud-computing facility to cloud-computing-infrastructure users. A cloud-director management server exposes virtual devices of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
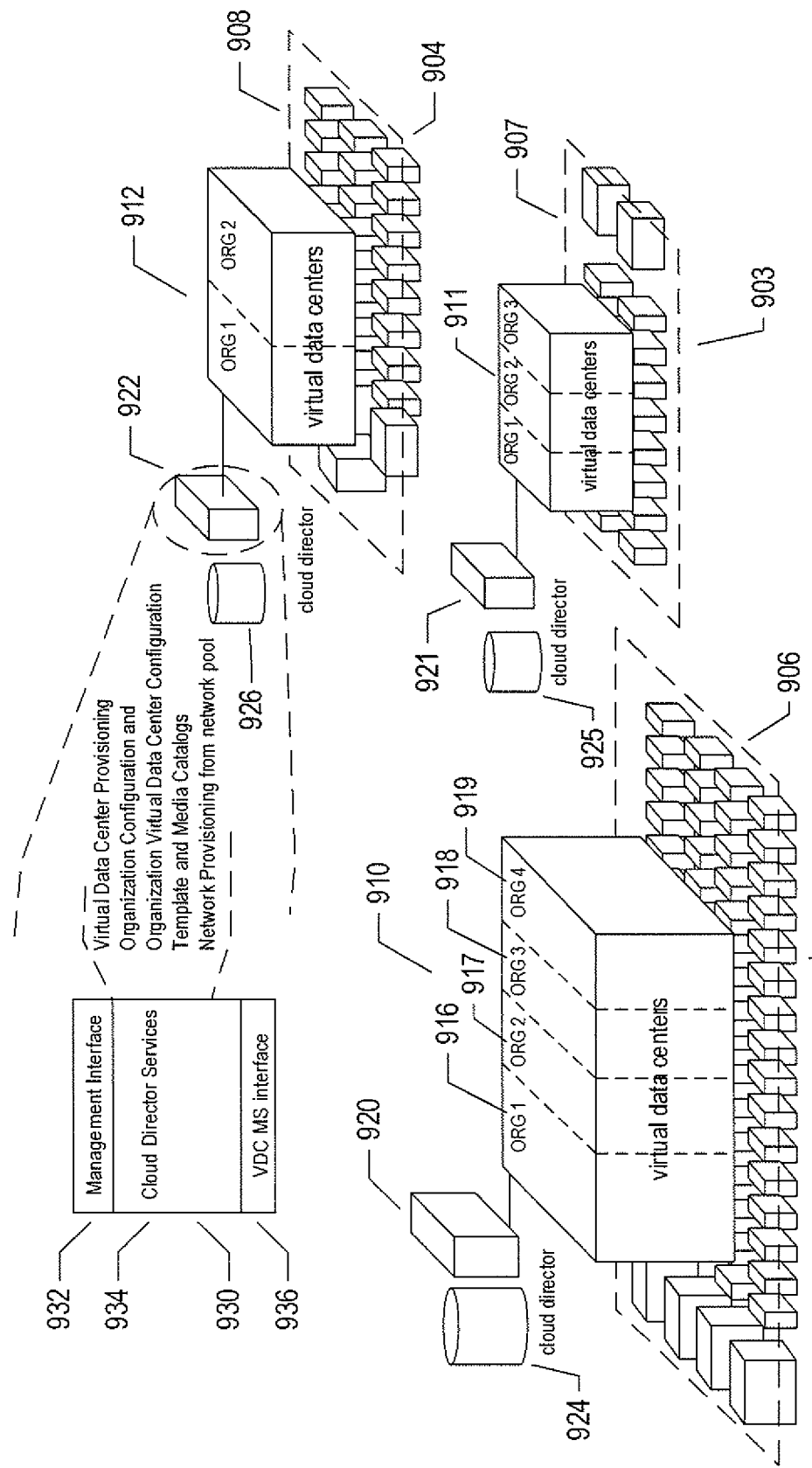
FIG. 9 shows a cloud-director level of abstraction.

FIG. 9 shows a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The devices of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are VMs that each contains an OS and/or one or more VMs containing applications. A template may include much of the detailed contents of VMs and virtual appliances that are encoded within OVF packages, so that the task of configuring a VM or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
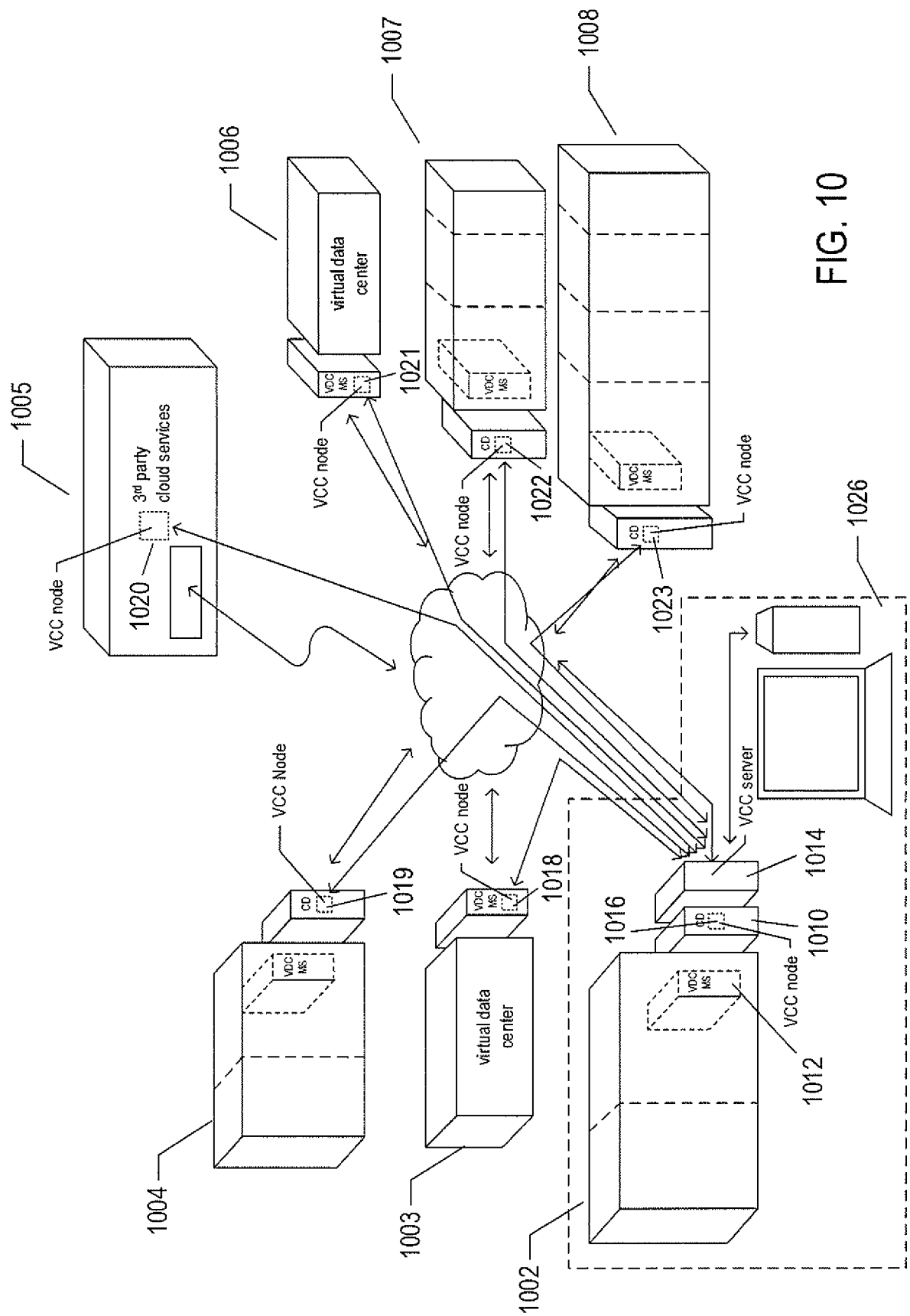
FIG. 10 shows virtual-cloud-connector nodes.

FIG. 10 shows virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are shown 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Methods and Systems to Sample Event Messages

Figure 11:
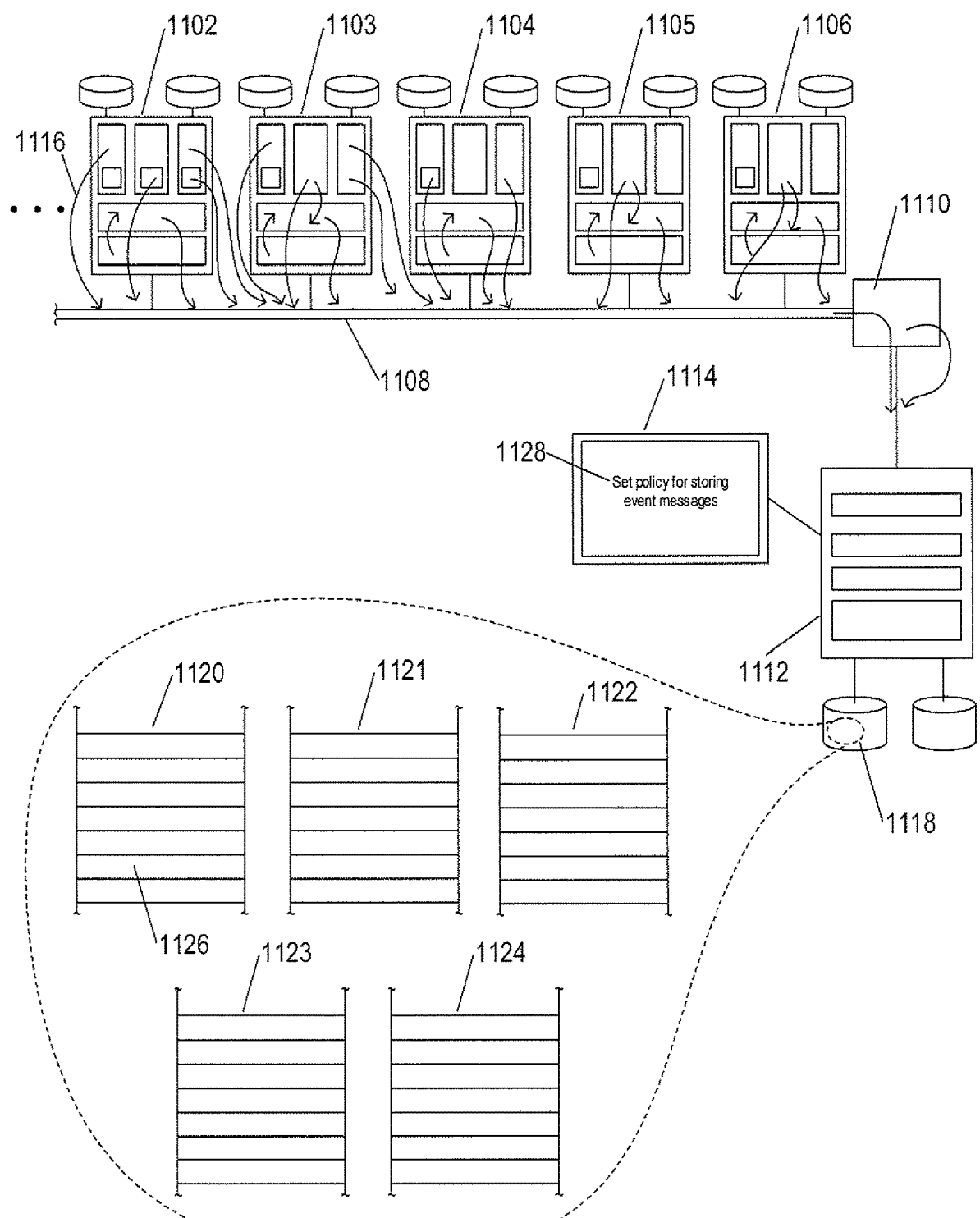
FIG. 11 shows an example of logging event messages in event-log files.

FIG. 11 shows an example of logging event messages in event-log files. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102-1106 as well as the communications bridge/router 1110 generate event messages that are transmitted to the administration computer 1112. Event messages may be generated by application programs, operating systems, VMs, guest operating systems, and other computer programs running on the computer systems 1102-1106 and the bridge/router 1110. Event messages may be relatively directly transmitted from a component within a discrete computer system to the administration computer 1112 or may be collected at various hierarchical levels within a discrete computer system and then forwarded from an event-message-collecting entity within the discrete computer system to the administration computer 1112. The administration computer 1112 collects and stores the received event messages in a data-storage device or appliance 1118 as event-log files 1120-1124. Rectangles, such as rectangle 1126, represent individual event messages. For example, event-log file 1120 may comprise a list of event messages generated within the computer system 1102. Methods described below enable an administrator, or other user, to set a policy 1128 regarding how incoming event messages are sampled and stored using a graphical user interface ("GUI") displayed on the administrative console 1114.

Figure 12:
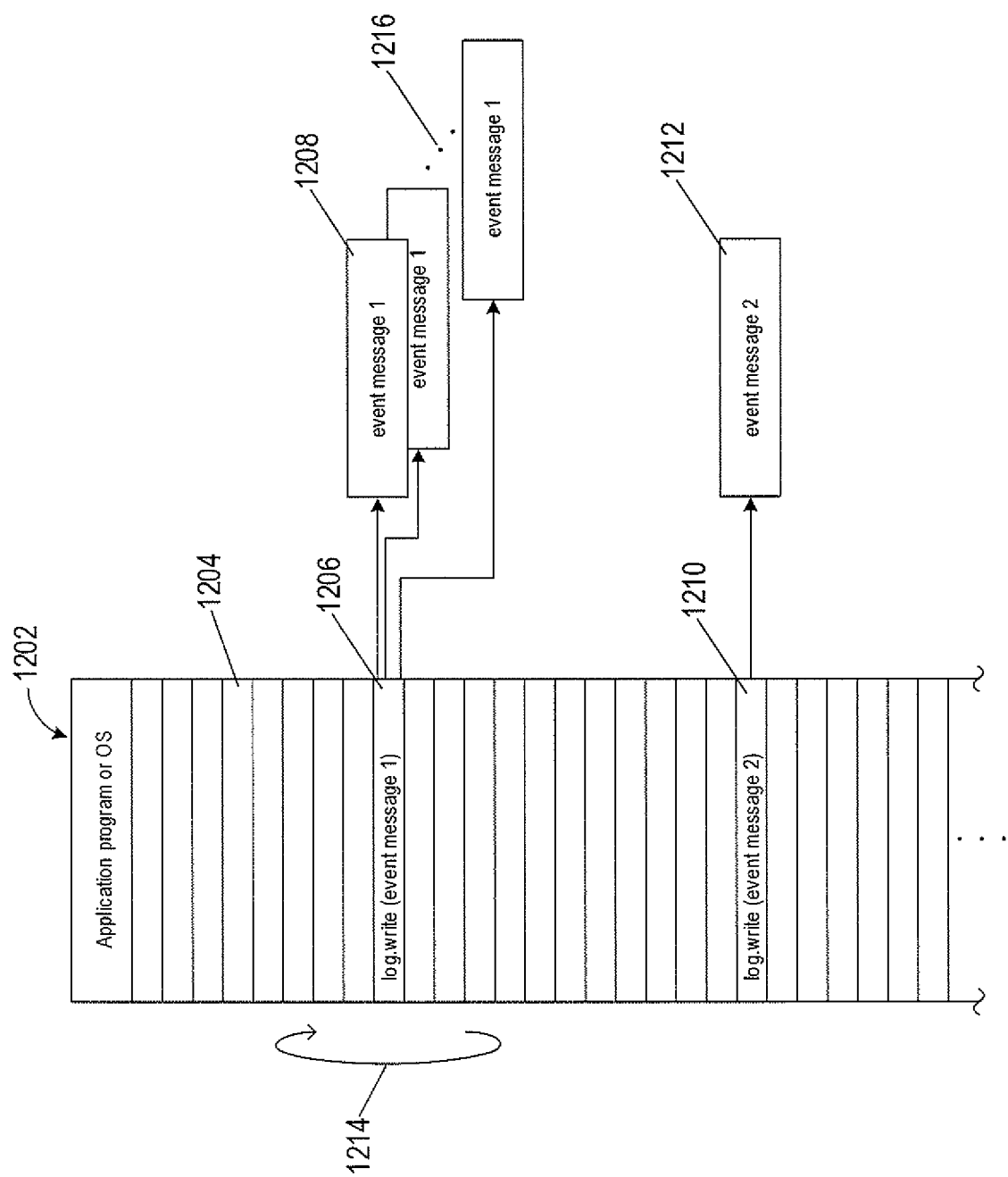
FIG. 12 shows an example of a source code with log write instructions.

FIG. 12 shows an example of a source code 1202 of an application program, an operating system, a VM, a guest operating system, or any other computer program or machine code. Rectangles, such as rectangle 1204, represent a definition, a comment, a statement, or a computer instruction that expresses some action to be executed by a computer. The source code 1202 includes log write instructions that generate event messages when certain events predetermined by the developer occur during execution of the source code 1202. For example, source code 1202 includes an example log write instruction 1206 that when executed generates an event message 1 represented by rectangle 1208, and a second example log write instruction 1210 that when executed generates event message 2 represented by rectangle 1212. In the example of FIG. 2, the log write instruction 1208 is embedded within a set of computer instructions that are repeatedly executed in a loop 1214. As shown in FIG. 2, the same event message 1 is repeatedly generated 1216. The same type of log write instructions may also be located in different places throughout the source code, which in turns creates repeats of essentially the same type of event message in the event-log file.

Note that the notation "log.write( )" is a general representation of a log write instruction. In practice, the form of the log write instruction varies for different programming languages. In general, event messages are relatively cryptic, including generally only one or two natural-language words and/or phrases as well as various types of text strings that represent file names, path names, and, perhaps various alphanumeric parameters. In practice, a log write instruction may also include the name of the source of the event message (e.g., name of the application program or operating system and version) and the name of the event-log file to which the event message is written. Log write instructions may be written in a source code by the developer of an application program or operating system in order to record events that occur while an operating system or application program is running as event messages. For example, a developer may include log write instructions that are executed when certain events occur, such as failures, logins, or errors.

FIG. 13 shows an example of a log write instruction 1302. In the example of FIG. 13, the log write instruction 1302 includes arguments identified with "$." For example, the log write instruction 1302 includes a time-stamp argument 1304, a thread number argument 1305, and an internet protocol ("IP") address argument 1306. The example log write instruction 1302 also includes text strings and natural-language words and phrases that identify the type of event that triggered the log write instruction, such as "Repair session" 1308. The text strings between brackets "[ ]" represent file-system paths, such as path 1310. When the log write instruction 1302 is executed, parametric values are assigned to the arguments and the text strings and natural-language words and phrases are stored as an event message in an event-log file.

FIG. 14 shows an example of an event message 1402 generated by the log write instruction 1302. The arguments of the log write instruction 1302 are assigned numerical parameters that are recorded in the event message 1402 at the time the event message is written to the event-log file. For example, the time stamp 1304, thread 1305, and IP address 1306 of the log write instruction 1302 are assigned corresponding numerical parameters 1404-1406 in the event message 1402. The time stamp 1404, in particular, represents the date and time the event message is generated. The text strings and natural-language words and phrases of the log write instruction 1302 also appear unchanged in the event message 1402 and may be used to identify the type of event that occurred during execution of the application program or operating system.

Figure 15:
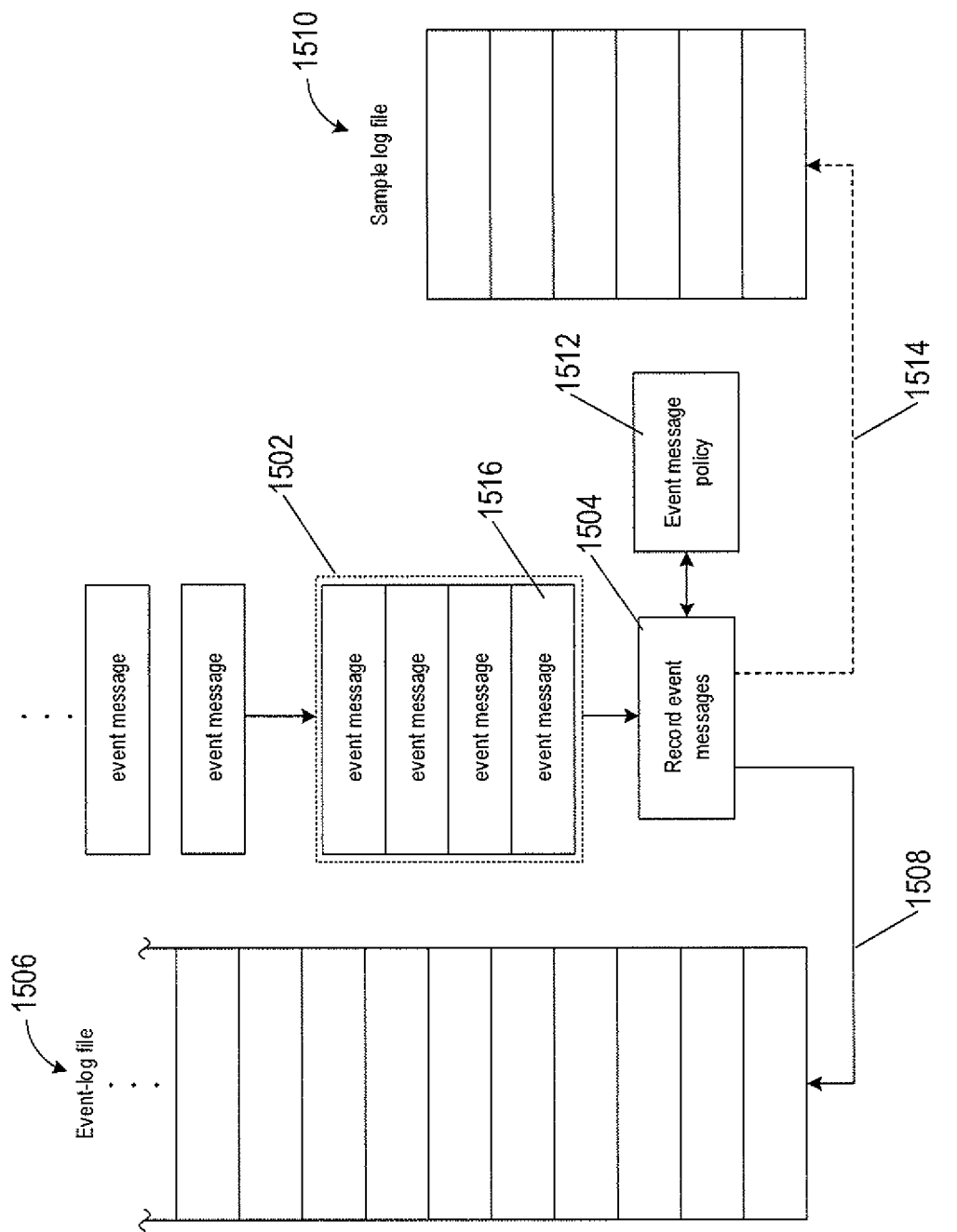
FIG. 15 shows an example of recording event messages according to an event message policy.

As event messages are received at the administration computer 1112, the event messages may be stored and sampled according to an event message policy. FIG. 15 shows an example of storing event messages according to an event message policy. As event messages are received from various sources, the event messages are stored in an event message storage queue or buffer 1502. The administration computer 1112 executes a method to store event messages 1504 in the order in which the event messages are received and stored in the storage queue 1502. In other words, the event message stored in the storage queue 1502 the longest is the next message to be received by the record event messages 1504. The method record event messages 1504 records each event message in the event-log file 1506 as indicated by directional arrow 1508. Whether or not the method record event messages 1504 stores the same event message in a sample log file 1510 depends on the event message policy 1512 as represented by dashed directional arrow 1514. The event message policy 1514 is used to determine which event messages are sampled and stored in the sample log file 1510. For example, record event messages 1504 receives an event message 1516 from the storage queue 1502 and stores the event message 1516 in the event-log file 1506. The method record event messages 1504 also generates a copy of the same event message 1516 and evaluates the event message 1516 in accordance with the event message policy 1512. The event message 1516 may or may not be stored in the sample log file 1510, depending on the event message policy 1512.

FIG. 16 shows a small, eight-entry portion of an event-log file 1602. In FIG. 16, each rectangular cell, such as rectangular cell 1604, of the portion of the event-log file 1602 represents a single stored event message. For example, event message 1602 includes a short natural-language phrase 1606, date 1608 and time 1610 numerical parameters, as well as, a numerical parameter 1612 that appears to identify a particular host computer.

Because the sample log file contains only a sample of the event messages received by the administration computer 1112, the sample log file may occupy considerable less storage space than the event-log file would occupy. As a result, querying the sample log file for specific types of events is much faster than querying the entire contents of the event-log file, which may contain terabytes of event messages. In addition, one query of the full event-log file may produce tens of the thousands of event messages that match the query, while another query may only return a hand full of event messages.

The text strings and natural-language words and phrases of each event message describe a particular type of event called an "event type." For example, the text strings and natural-language words and phrases, called "non-parametric tokens," of the event message 1402 shown in FIG. 14 identify the event type. As explained above, each time the log write instruction 1302 of FIG. 13 is executed, only the parameter values are changed, such as the time and date. The non-variable text strings and natural-language words and phrases (i.e., non-parametric tokens) are the same for each event message generated by the log write instruction 1302 and stored in the event-log file. Event-type analysis may be used to identify the event type of each event message based on the non-parametric tokens, and event messages of the same event type may be counted. A record of the different event types and number of each event type may be recorded in an event-type log file.

Figure 17:
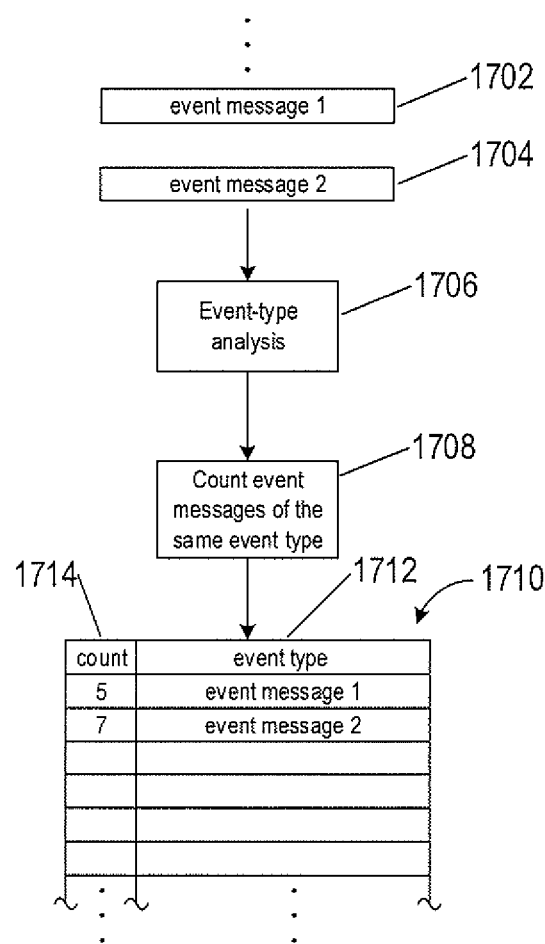
FIG. 17 shows examples of event messages of event types sorted according the event type.

FIG. 17 shows examples of event messages of event types sorted according the event type. Rectangles, such as rectangles 1702 and 1704, represent event messages of two different event types. Event message 1 belongs to a first event type and event message 2 belongs to a second event type. Event-type analysis 1706 is applied to each event message in order to determine the non-parametric tokens of each event message. Event messages having the same non-parametric tokens may be regarded as being of the same event type. Event messages of the same event type are counted 1708. For example, five event messages have been identified using event-type analysis 1706 as being of the same event type as event message 1, but may have different parametric values, such as time and date. Seven event messages have been identified using event-type analysis 1706 as being of the same event type as event message 2, but may have different parametric values, such as time and date. Event messages of the same event type are counted 1708 and represented in an event-type log file 1710. Column 1712 lists the most recently generated event messages of the same event type. Column 1714 lists counts associated with the different event types.

Figure 18B:
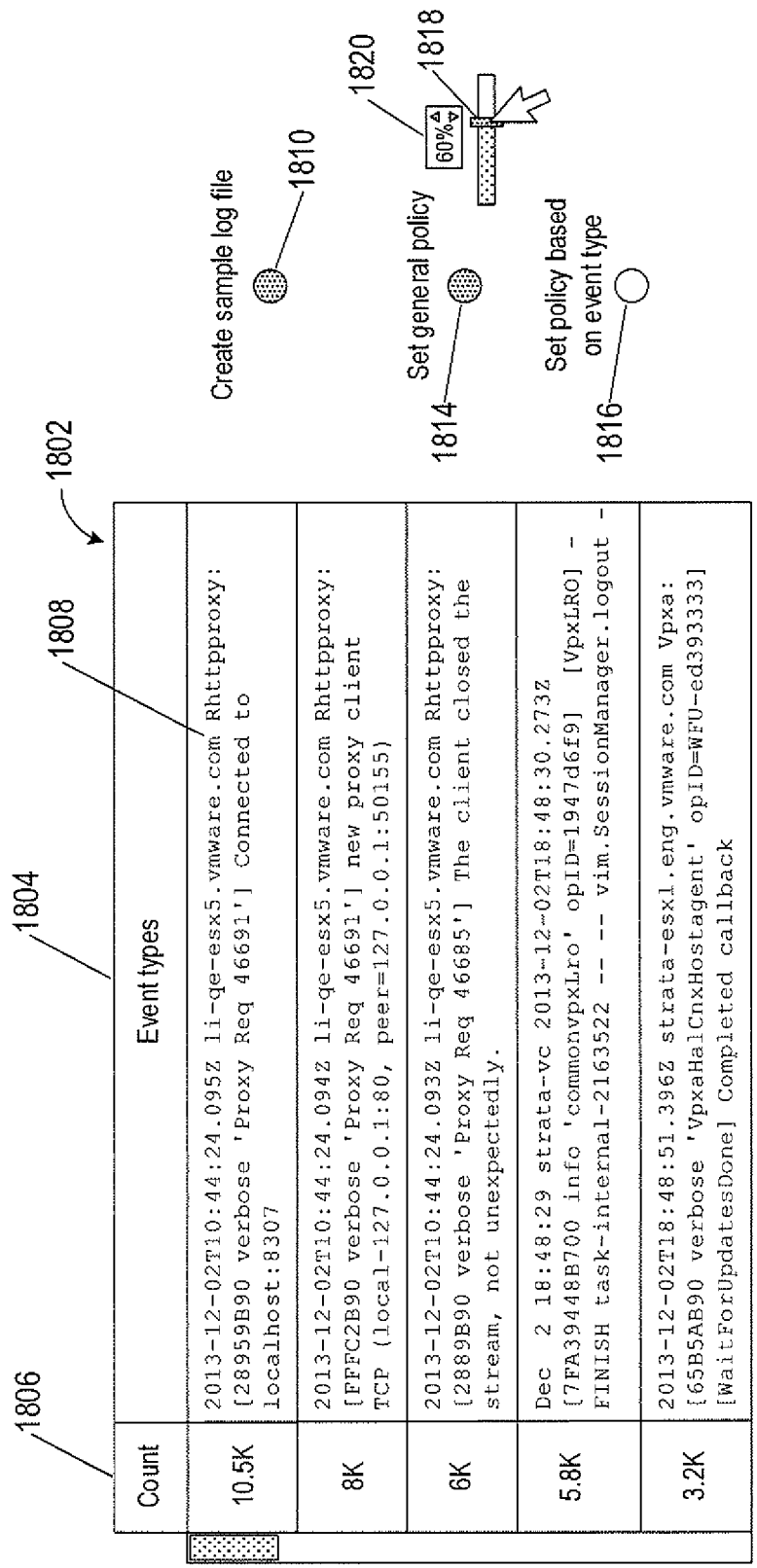

An administrator may be able to select how event messages are to be sampled and stored in a sample log file. FIG. 18A-18B show a graphical user interface ("GUI") 1802 that an administrator or other user may use to determine how event messages are to be sampled. In FIG. 18A, the GUT 1802 displays a table of different event types and counts associated with each event type as recorded in an event-type log file. The user may use a scrollbar 1804 to scroll up and down through the list of event types. In this example, each event type is represented by a most recently generated event message. The table also displays counts of each event type in a column 1806. For example, an event type represented by event message 1808 has been generated about 10,500 times over a period of time. The GUI 1802 includes a button 1810 that enables an administrator or user to select creation of a sample log file when the button 1810 is clicked on using a cursor 1812. In FIG. 18B, clicking on the button 1810 activates a button 1814 for setting a general policy and activates a button 1816 for setting a policy based on event type. In the example of FIG. 18B, the button 1814 has been clicked, which activates a slider, or graphical control element, 1818 and a field 1820. In this example, an administrator or user selected or entered a general sample rate of 60% that appears in the field 1820. The sample rate is used to randomly store approximately 60% of the event messages input to the administration computer 1112 in the sample log file. In other words, the event message policy may be used to store at random approximately 60% of event messages in the sample log file.

Figure 19:
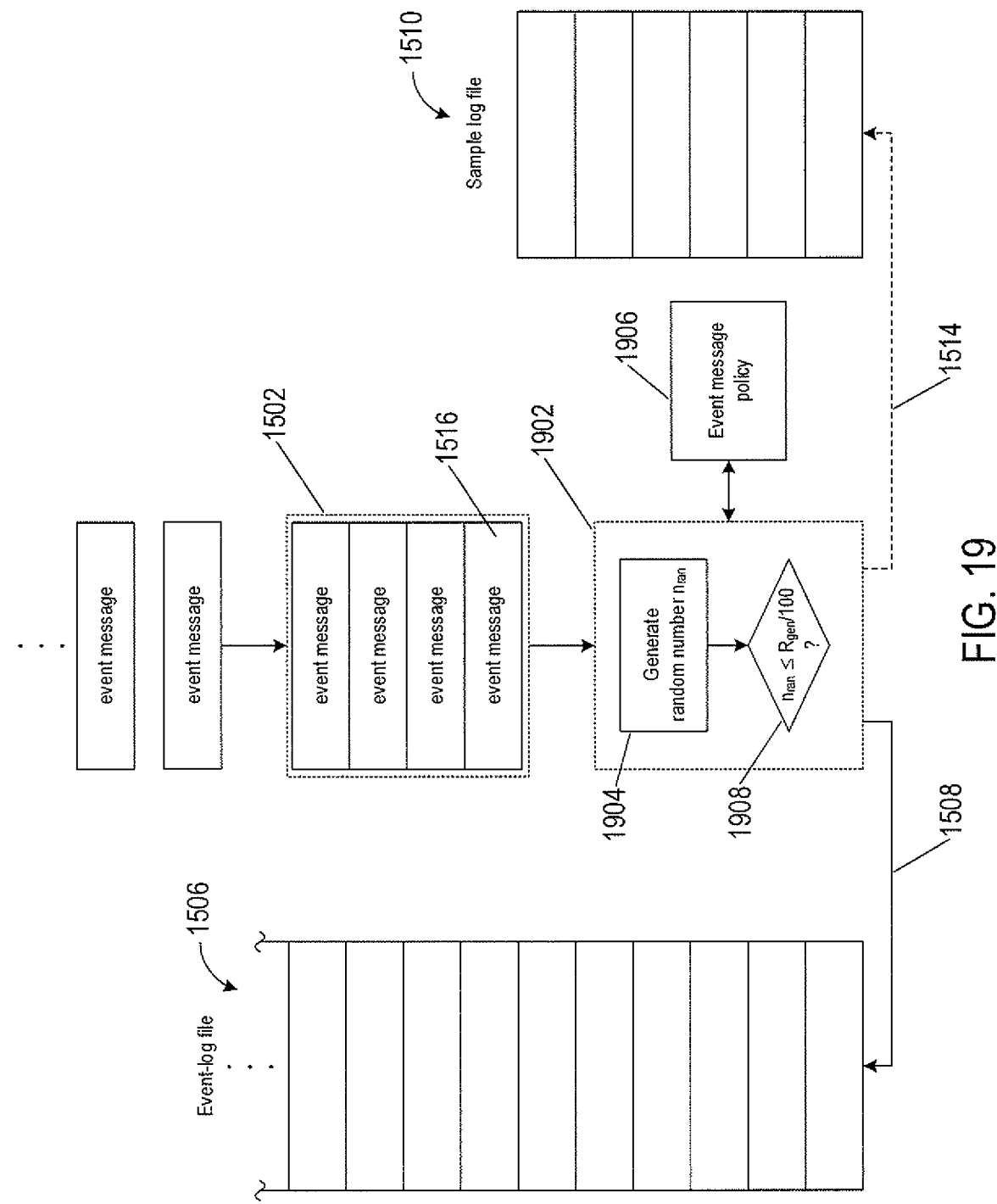
FIG. 19 shows an example method to randomly sample event messages.

Let $R_{gen}$ denote a user-selected general sample rate input by an administrator or user to the GUI 1802. FIG. 19 shows an example method to record event messages 1902 that randomly samples event messages at the sample rate $R_{gen}$ for storing in the sample log file 1510. As described above with reference to FIG. 15, the event message 1512 is stored in the event-log file 1506. In FIG. 19, for each event message output from the storage queue 1502, the method record event messages 1902 uses a random number generator to generate random number, denoted by $n_{ran}$, at block 1904. The value of the random number $n_{ran}$ is between 0 and 1 (i.e., $0 \leq n_{ran} \leq 1$). In this example, the sample rate $R_{gen}$ is the event message policy 1906 that is used to determine whether or not the event message 1516 may be stored in the sample log file 1510. At decision block 1908, when a condition $n_{ran} \leq R_{gen}/100$ is satisfied, the event message 1516 is stored in the sample log file 1510, as represented by dashed directional arrow 1514. On the other hand, when the condition $n_{ran} \leq R_{gen}/100$ is not satisfied, the event message 1518 is not stored in the sample log file. In other words, the quantity $R_{gen}/100$ is a threshold on the random numbers in which event messages with an associated random number less than $R_{gen}/100$ are stored in the sample log file. The operations represented by blocks 1904 and 1908 are repeated for each event message output from the storage queue 1502. As number of event messages stored in the sample log file 1510 increases over time, the percentages of different event types stored in the sample log file approximates the percentages of same event types stored in the much larger event-log file. As a result, the sample log file may be queried to determine if specific event types have been generated rather than querying a much large event-log file, which is a considerable savings in the amount of computational time that would needed to carry out the same query in the much larger event-log files.

Figure 20:
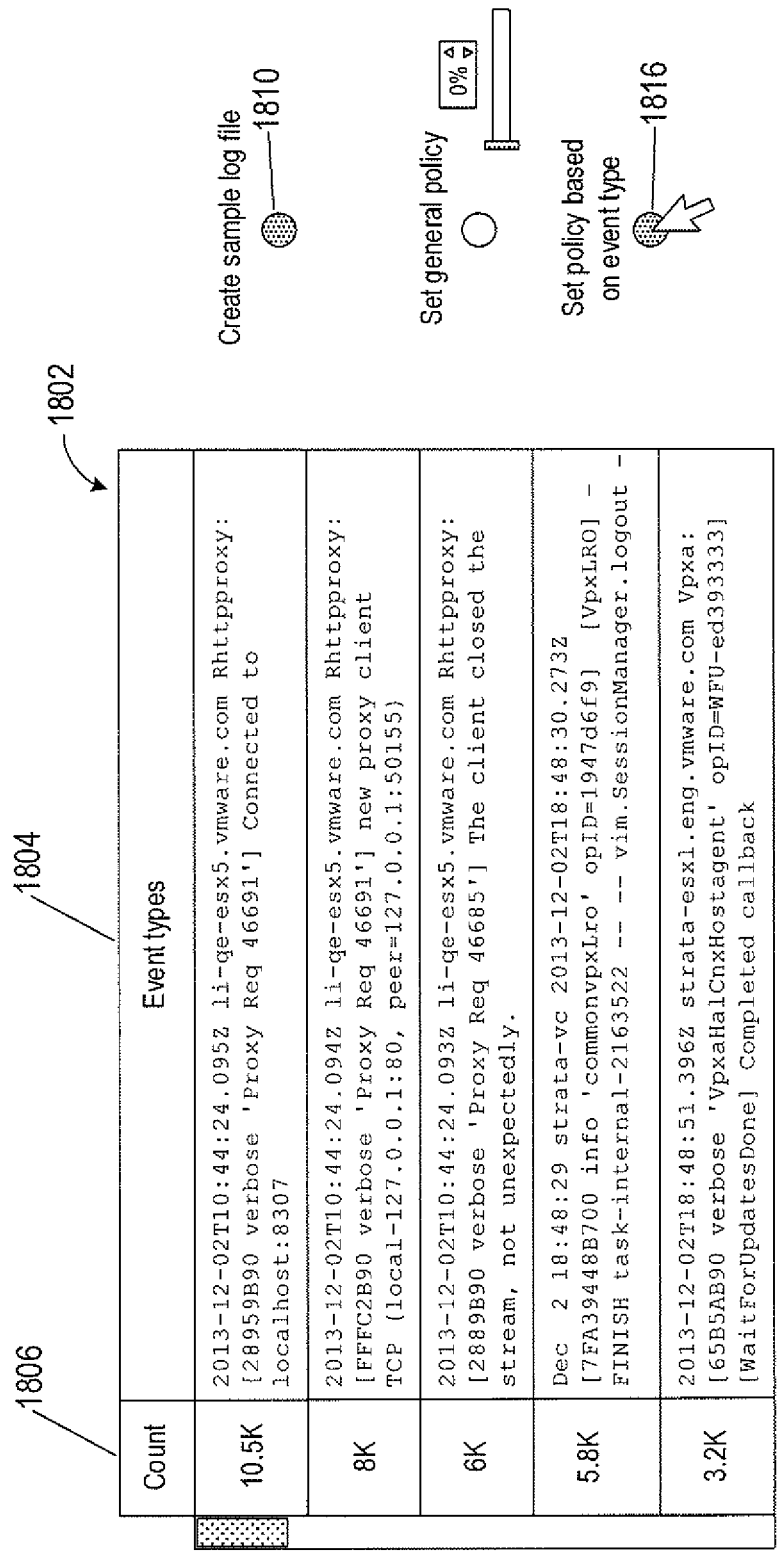
FIG. 20 shows the GUI shown in FIGS. 18A-18B used to set an event message policy based on event type.
Figure 21:
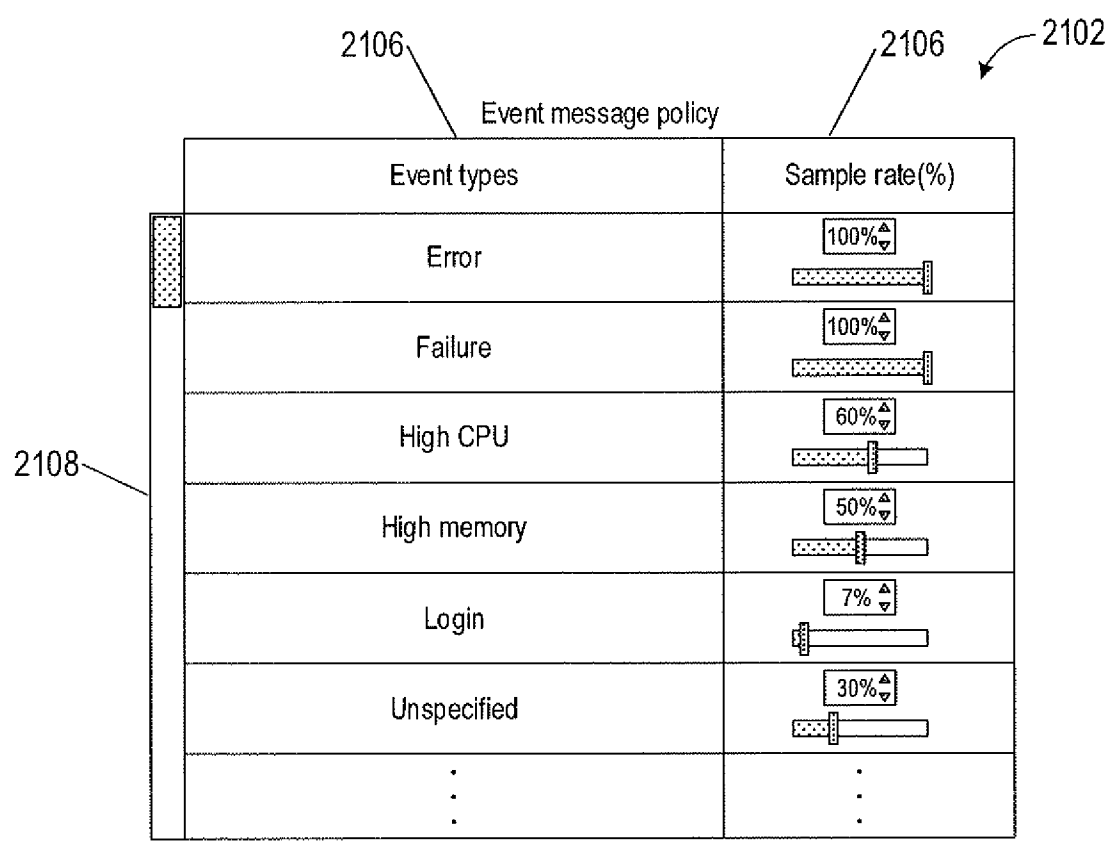

FIG. 20 shows the GUI 1802 when an administrator has selected create a sample log file by clicking on button 1810 and selected setting the event message policy based on different event types by clicking on the button 1816. When an administrator or user has selected create event message policy based on the different event message types, a GUI 2102 may be displayed as shown in FIG. 21. As described above with reference to FIG. 16, event-type analysis is used to identify the event type of the event messages received based on the non-parametric text strings and natural language words and/or phrases. The GUI 2102 comprises a column 2104 that list different event types, including, but not limited to "Error," "Failure," "High CPU," "High memory," "Logic," and "Unspecified." The GUI 2104 comprises a second column 2106 that allows the administrator or user to select a sample rate for each of the different event types using a slider. A scrollbar 2108 may be used to scroll through the different event types. In the example of FIG. 21, the administrator selected or entered a sample rate of 100% for event messages that are identified by event-type analysis as "Errors" and "Failure." The administrator selected or entered sample rates of 60%, 50%, and 7% for event messages identified as "High CPU," High memory," and "Login" event types using event-type analysis. The "Unspecified" event type represents event messages that are not identified as being a specified event type.

Figure 22A:
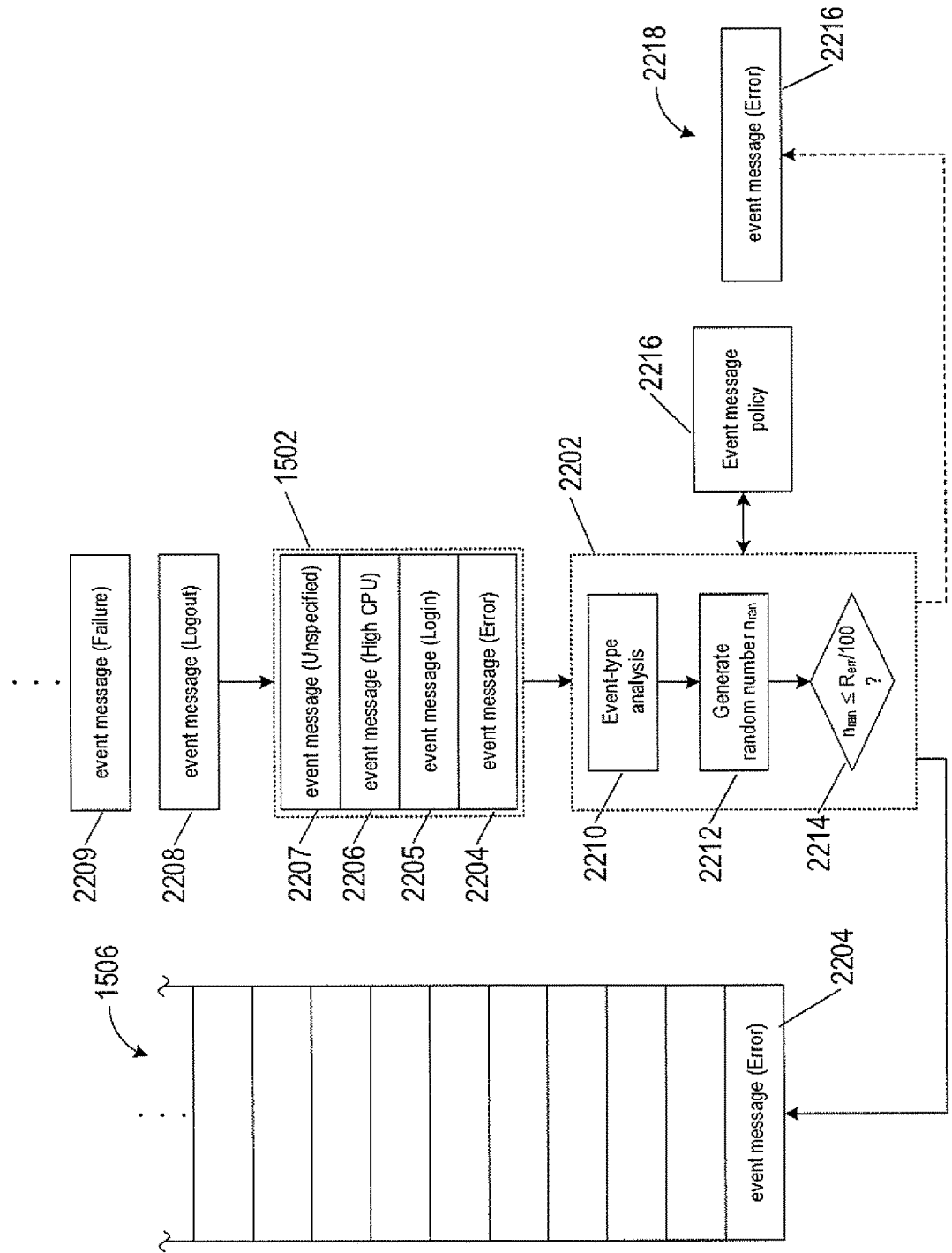
FIGS. 22A-22F show examples a method to record six event messages according to different sample rates.
Figure 22B:
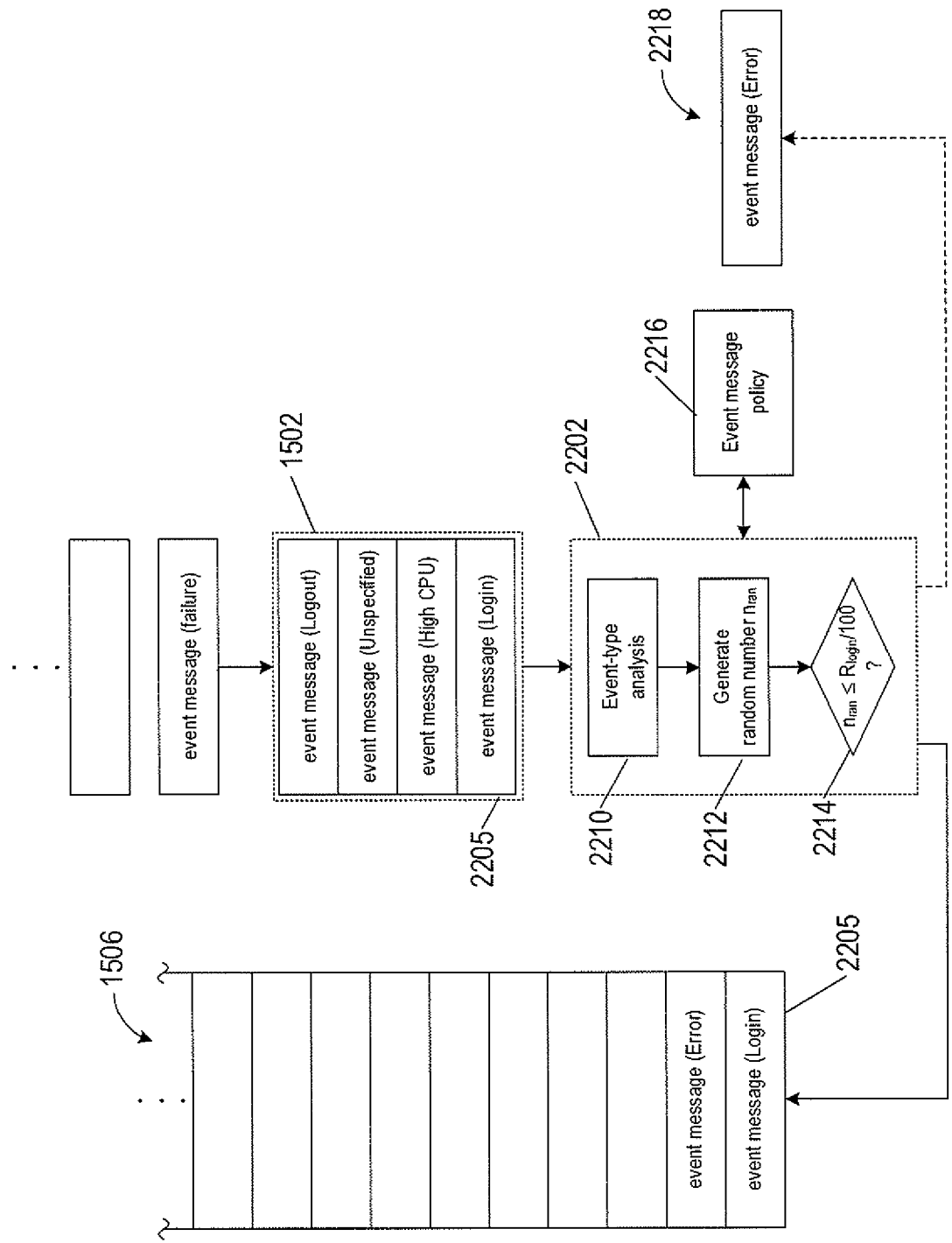
Figure 22C:
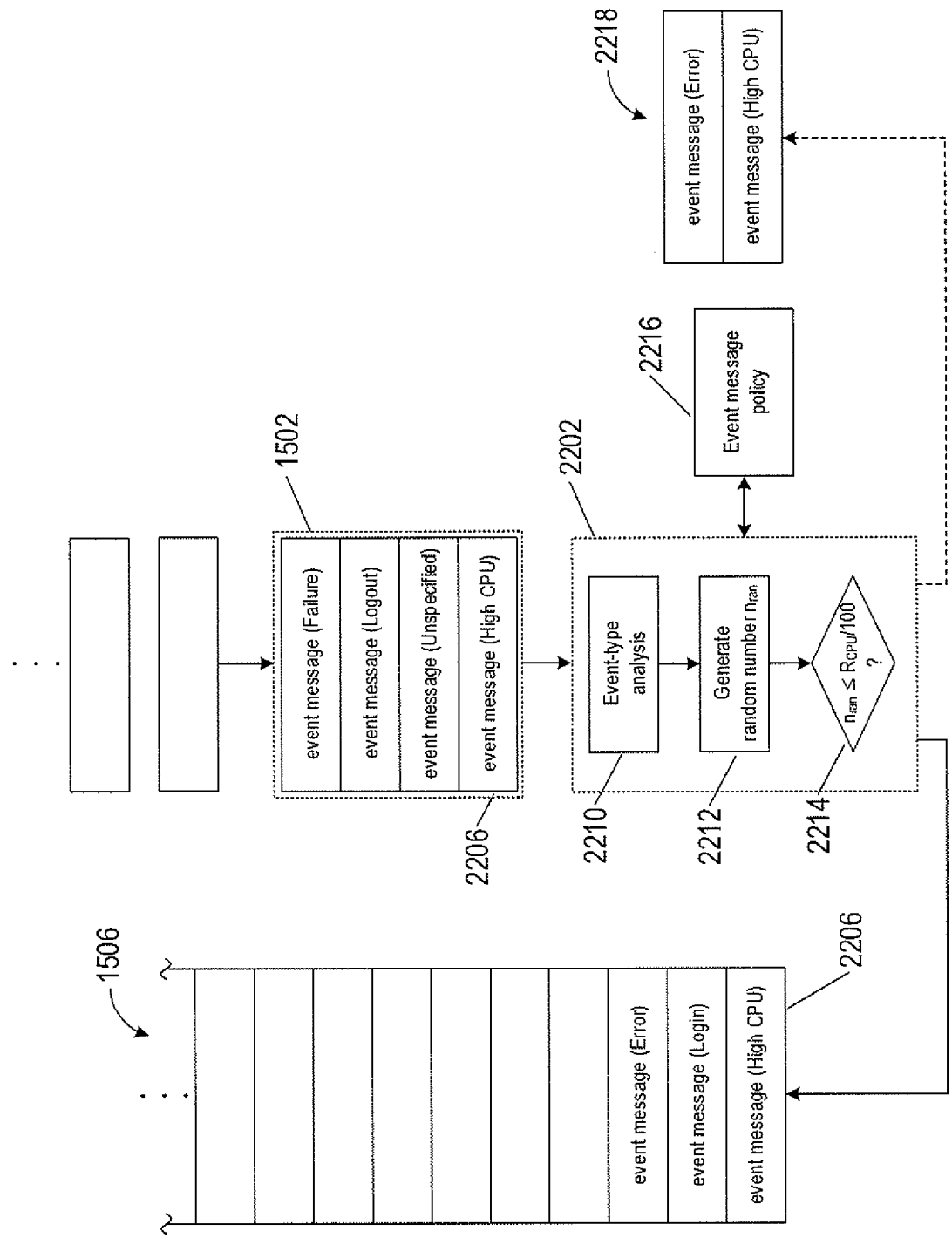
Figure 22D:
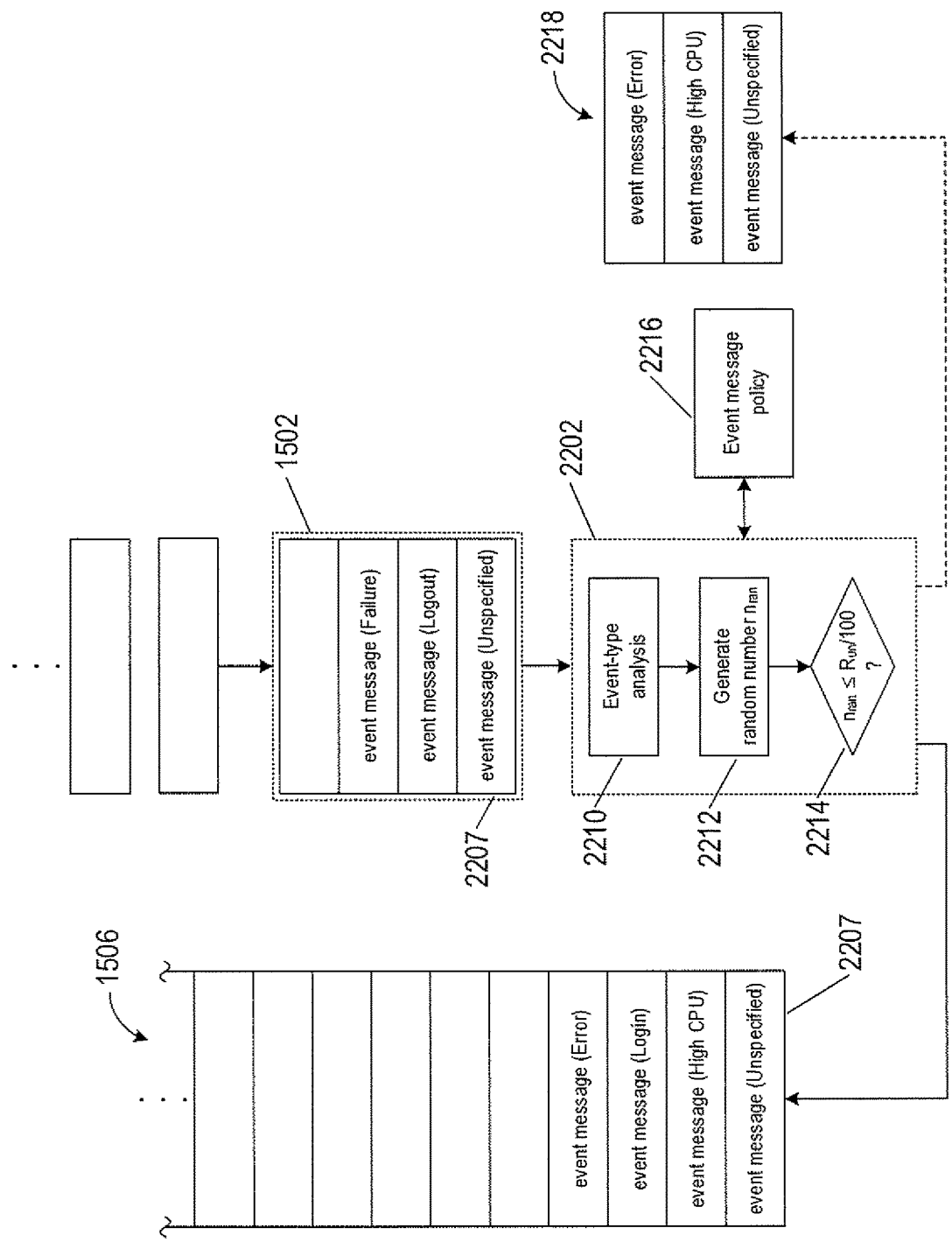
Figure 22E:
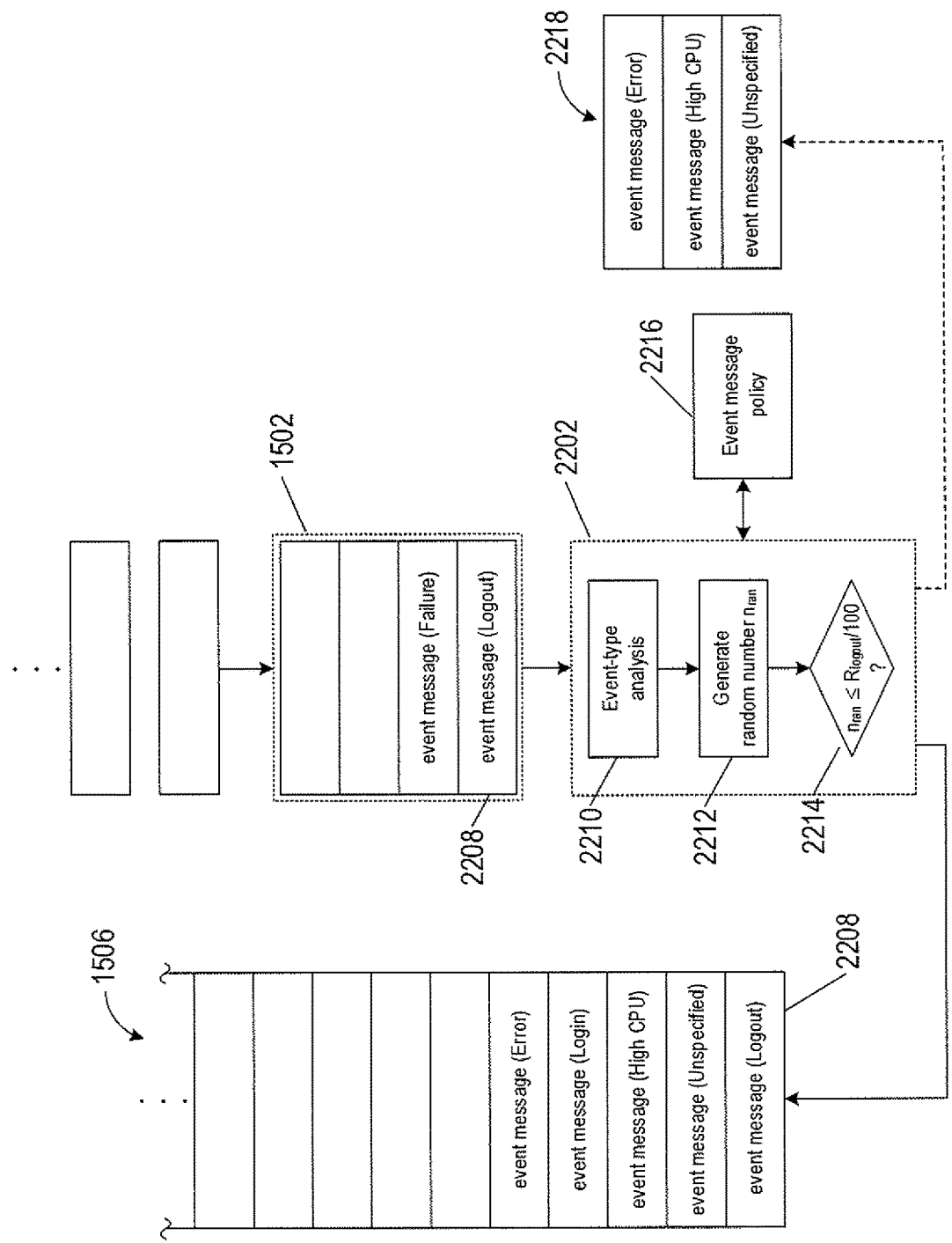
Figure 22F:
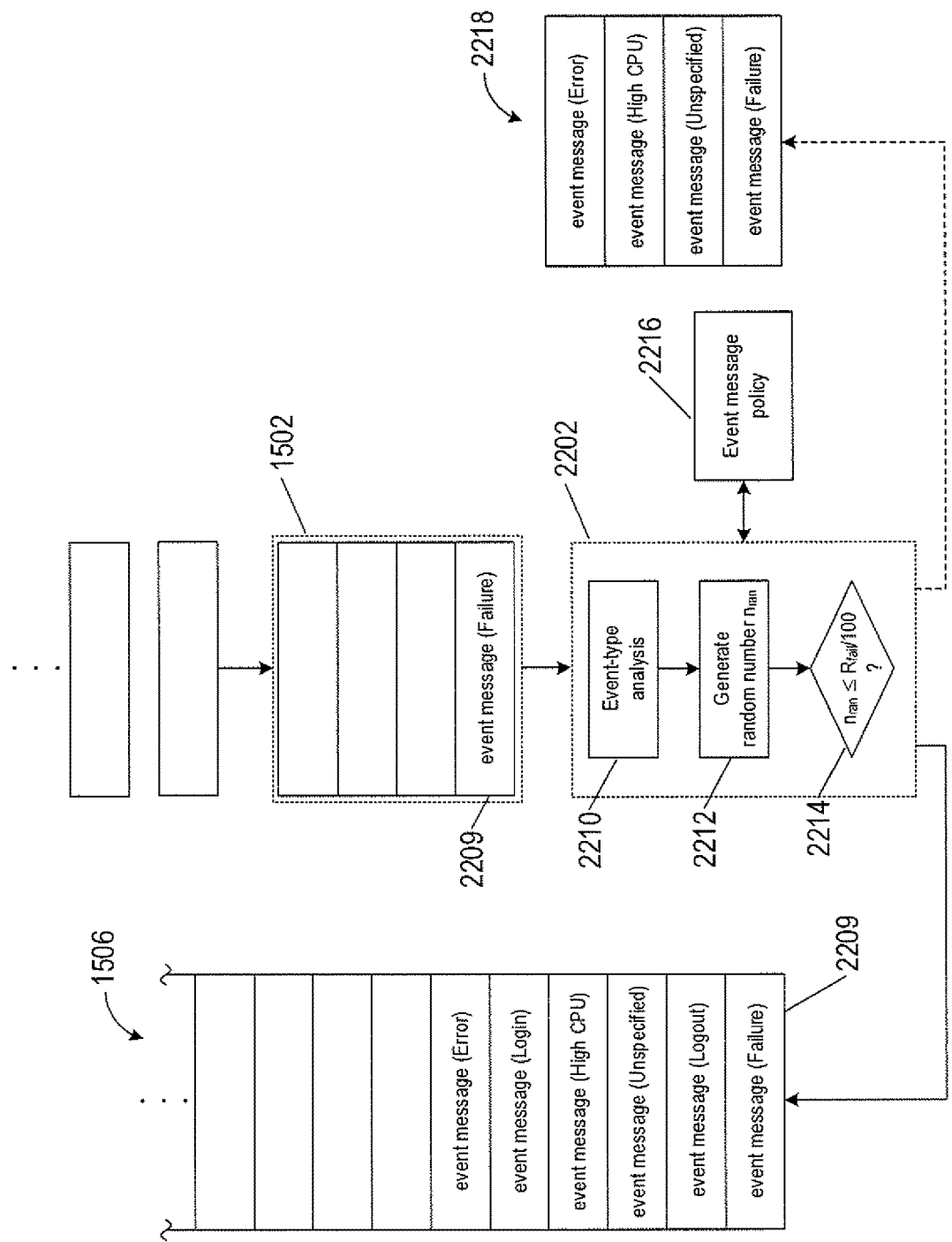

FIGS. 22A-22F show examples a method to store six event messages 2202 in an event-log file and randomly sample the event messages at sample rates associated with different event types for storage in a sample log file. In this example, the event types of the six event message are represented in parentheses. Four of the event messages are stored in the storage queue 1502 and two others are in line to be stored in the storage queue 1502 (i.e., are in the process of being sent to the administration computer 1112). Event messages 2204-2209 record an error event, a login event, a high CPU usage event, and unspecified event 2207, a logout event, and a failure event, respectively. In each of FIGS. 22A-22F, the six event messages are stored in the event-log file 1506, as described above with reference to FIG. 15. FIGS. 22A-22F show examples of when each event message input to the record event message 2202 undergoes event-type analysis in block 2210 in order to determine the event type of the event message followed by generating a random number $n_{ran}$ between 0 and 1 (i.e., $0 \leq n_{ran} \leq 1$) in block 2212. In each of FIGS. 22A-22F, a decision block 2214 executes an event message policy 2216 that comprises sample rates assigned to each of the event types. For example, certain sample rates may be assigned as described above with reference to FIG. 21. Each of FIGS. 22A-22F represents a different example of when the value of the random number $n_{ran}$ may or may not satisfy the conditions set in the decision block 2214. When the condition in the decision block 2214 of FIGS. 22A-22F is satisfied (e.g., when $n_{ran}$ is less than or equal to the sample rate multiplied 100), the event message is stored in a sample log file. In FIG. 22A, the event message (Error) 2204 is an error event type with an assigned sample rate $R_{err}$. In this example, the event message (Error) 2204 is the first entry stored in a sample log file 2218. In FIG. 22B, the event message (Login) 2205 is a login event type with an assigned sample rate $R_{login}$. In this example, the event message (Login) 2205 is not stored in the sample log file 2218. In FIG. 22C, the event message (High CPU) 2206 is a high CPU usage event type with an assigned sample rate $R_{CPU}$. In this example, the event message (High CPU) 2206 is stored in the sample log file 2218. In FIG. 22D, the event message (Unspecified) 2207 is an unspecified event type with an assigned sample rate $R_{un}$. In this example, the event message (Unspecified) 2207 is stored in the sample log file 2218. In FIG. 22E, the event message (Logout) 2208 is a logout event type with an assigned sample rate $R_{logout}$. In this example, the event message (Logout) 2208 is not stored in the sample log file 2218. In FIG. 22F, the event message (Failure) 2209 is a failure event type with an assigned sample rate $R_{fail}$. In this example, the event message (Failure) 2209 is stored in the sample log file 2218. In other words, each of the quantities $R_{err}/100$, $R_{login}/100$, $R_{CPU}/100$, $R_{un}/100$, $R_{logout}/100$ and $R_{fail}/100$ is an event type threshold in which event messages with an associated random number less than a corresponding event type threshold are stored in the sample log file.

Figure 23:
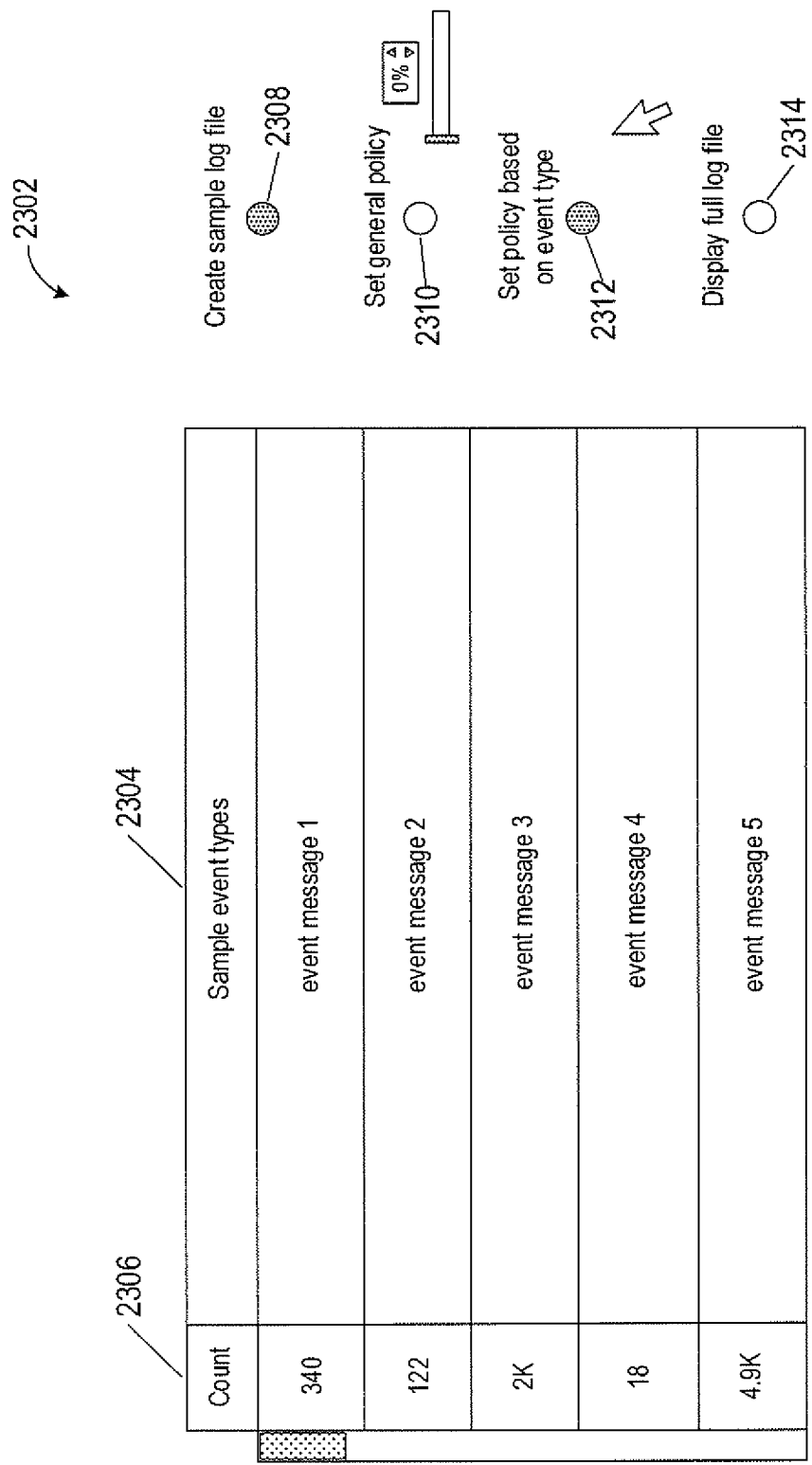
FIG. 23 shows an example of a GUI that displays counts of sample event types.

The sample event types may be displayed in a GUI that also enables an administrator or user to deselect creation of the sample log file or change the event message policy used to sample the event messages. FIG. 23 shows an example of a GUI 2302 that displays sample event types in a column 2304 and the count of event messages of each event type in a column 2306. The GUI 2302 displays a button 2308 that enables an administrator or user to deselect creation of the sample log file. The GUI 2302 displays buttons 2310 and 2312 that enable the administrator or user to change the policy as described above with reference to FIGS. 18 and 20. In this example, the administrator or user may change the policy from set policy based on event type to set a general policy. The GUI 2302 display a button 2314 that enables the administrator or user to display the full event log file or display the event-type log file as described above with reference to FIG. 18A.

Figure 24:
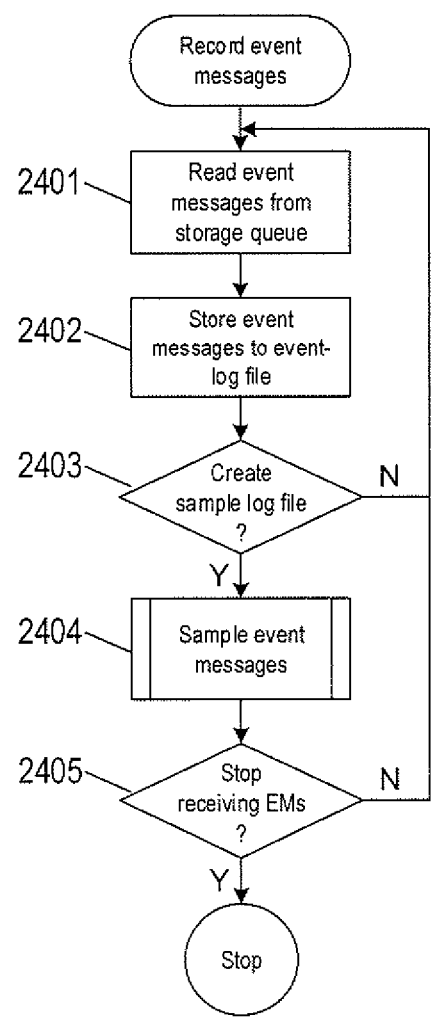
FIG. 24 shows a control-flow diagram of a method to record event messages.

FIG. 24 shows a control-flow diagram a method to record event messages. In block 2401, event messages are read from an event message storage queue, as described above with reference to FIG. 15. In block 2402, the event messages may be stored in an event-log file, as described above with reference to FIG. 15. In decision block 2403, a sample log file is created to store samples of the event messages read from the event message storage queue. In block 2404, a method "sample event messages" is called to sample the event messages in accordance with one or more sample rates of an event message policy as described above with reference to FIGS. 15, 19, and 22A-22F. In decision block 2405, receiving event messages may be stopped by an administrator for various reasons, such as shut down of the administration computer 1112 or other technical failures or errors.

Figure 25:
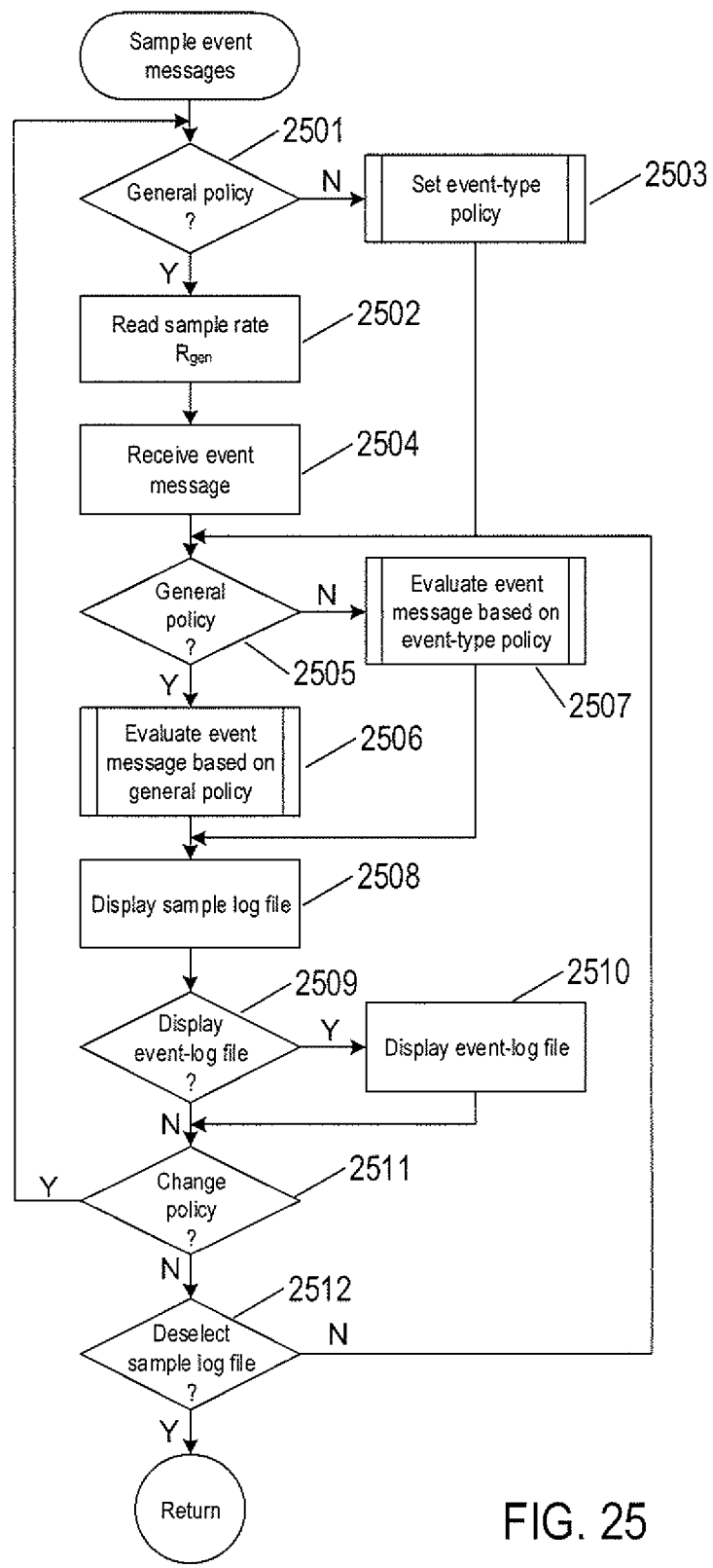
FIG. 25 shows control-flow diagram of the method "sample event messages" called in FIG. 24.

FIG. 25 shows control-flow diagram of the method "sample event messages" called in block 2404 of FIG. 24. In decision block 1501, when a user selects a general policy, as described above with reference to FIG. 18B, control flows to block 2502. Otherwise control flows to bloc 2503. In block 2502, a general sample rate $R_{gen}$ is read, as described above with reference to FIG. 18B. In block 2503, a method "set event-type policy" is called in order to allow a user to set sample rates of selected event types. In block 2504, an event message output from an event message storage queue is received, as described above with reference to FIG. 15. In decision block 2505, if a general policy has been selected, as described above with reference to FIG. 18B, then control flows to block 2506. Otherwise, the user has selected set event-type policy as described above with reference to FIG. 20 and control flows to block 2507. In block 2508, sample log file may be displayed using a GUI as shown in FIG. 23. In decision block 2509, when display event-log file or event-type log file has been selected, as described above with reference to FIG. 23, control flow to block 2510 and the event-log file is displayed or the event-type log file may be displayed as described above with reference to FIG. 18A. In decision block 2511, when the policy has been changed by selecting the general policy or the set policy based on event type using one of the GUIs 1802 and 2302, control flows to decision block 2501. In decision block 2512, when deselect sample log file has been selected by the user, sampling of event messages stops and the method returns.

Figure 26:
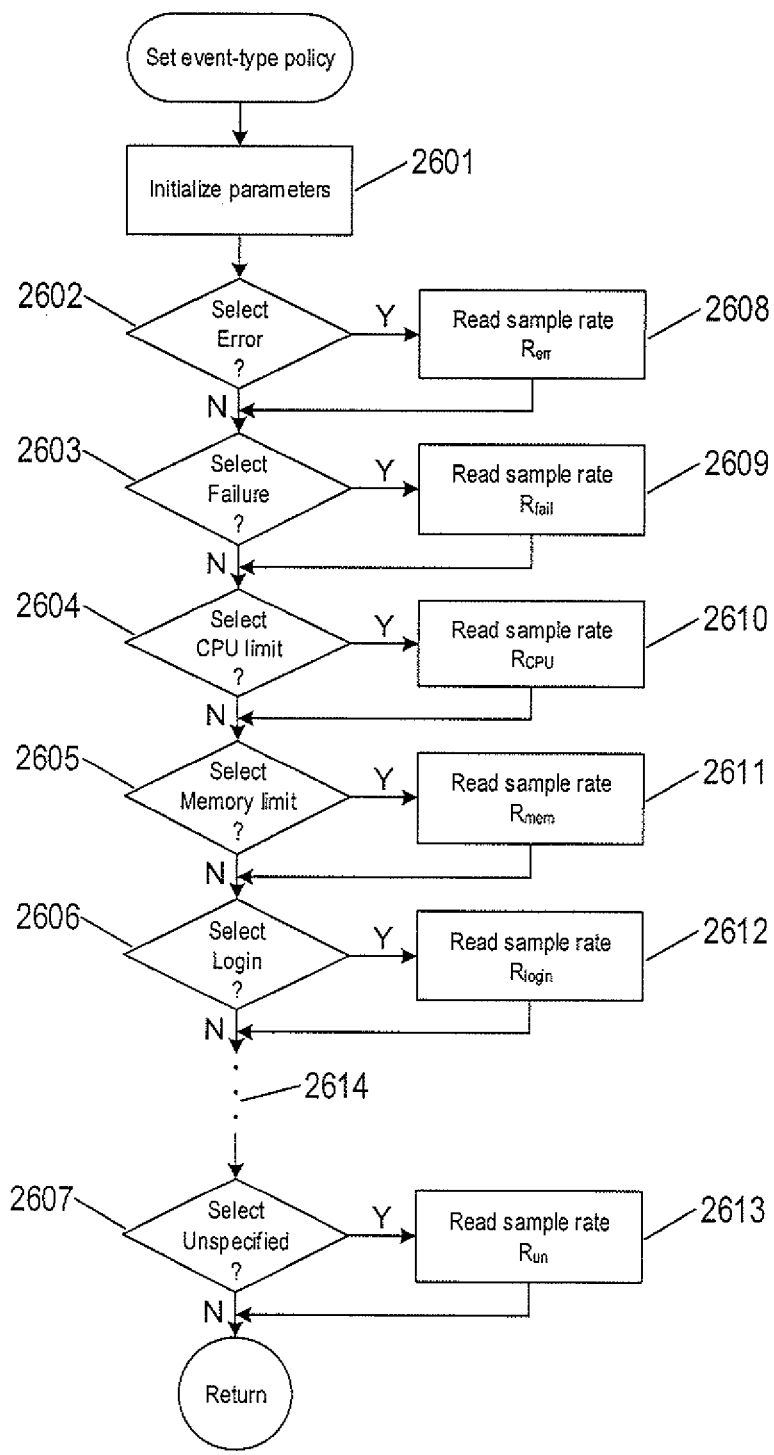
FIG. 26 shows a control-flow diagram of the method "set event-type policy" called in FIG. 25.

FIG. 26 shows a control-flow diagram of the method "set event-type policy" called in block 2503 of FIG. 25. In block 2601, the various types of sample rates associated with the different event types may be initialized to zero or another number. In decision blocks 2602-2606, a user selects sample rates for each of the different event types, as described above with reference to FIG. 21. In blocks 2608-2612, the sample rates of each event type is read and assigned to the corresponding parameters. For example, when a user has entered a failure sample rate as represented by decision bloc 2603 and as described above with reference to FIG. 21, the value of the failure sample rate entered into the GUI 2102 is read as assigned to $R_{fail}$. Ellipsis 2614 represents selection and reading of event types not listed.

Figure 27:
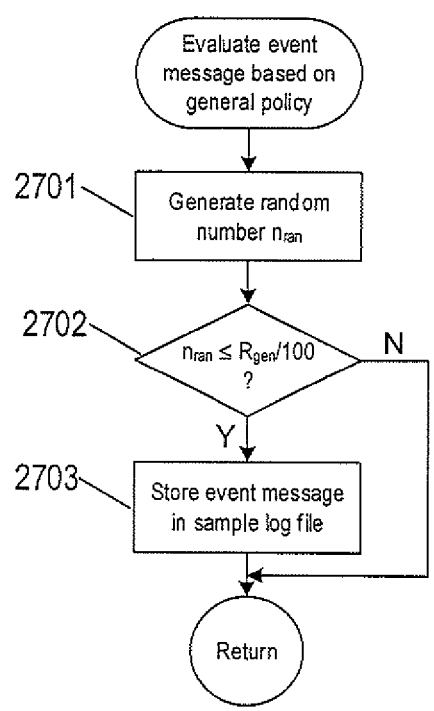
FIG. 27 shows a control-flow diagram of the method "evaluate event message based on general policy" called in FIG. 25.

FIG. 27 shows a control-flow diagram of the method "evaluate event message based on general policy" called in block 2506 of FIG. 25. In block 2701, a random number $n_{ran}$ is generated using a random number generator. In decision block 2702, when the random number satisfies the condition $n_{ran} \leq R_{gen}/100$, control flows to block 2703. Otherwise, the condition is not satisfied and control flows to block 2704. In block 2703, the event message is written or stored in a sample log file, as described above with reference to FIG. 19.

Figure 28:
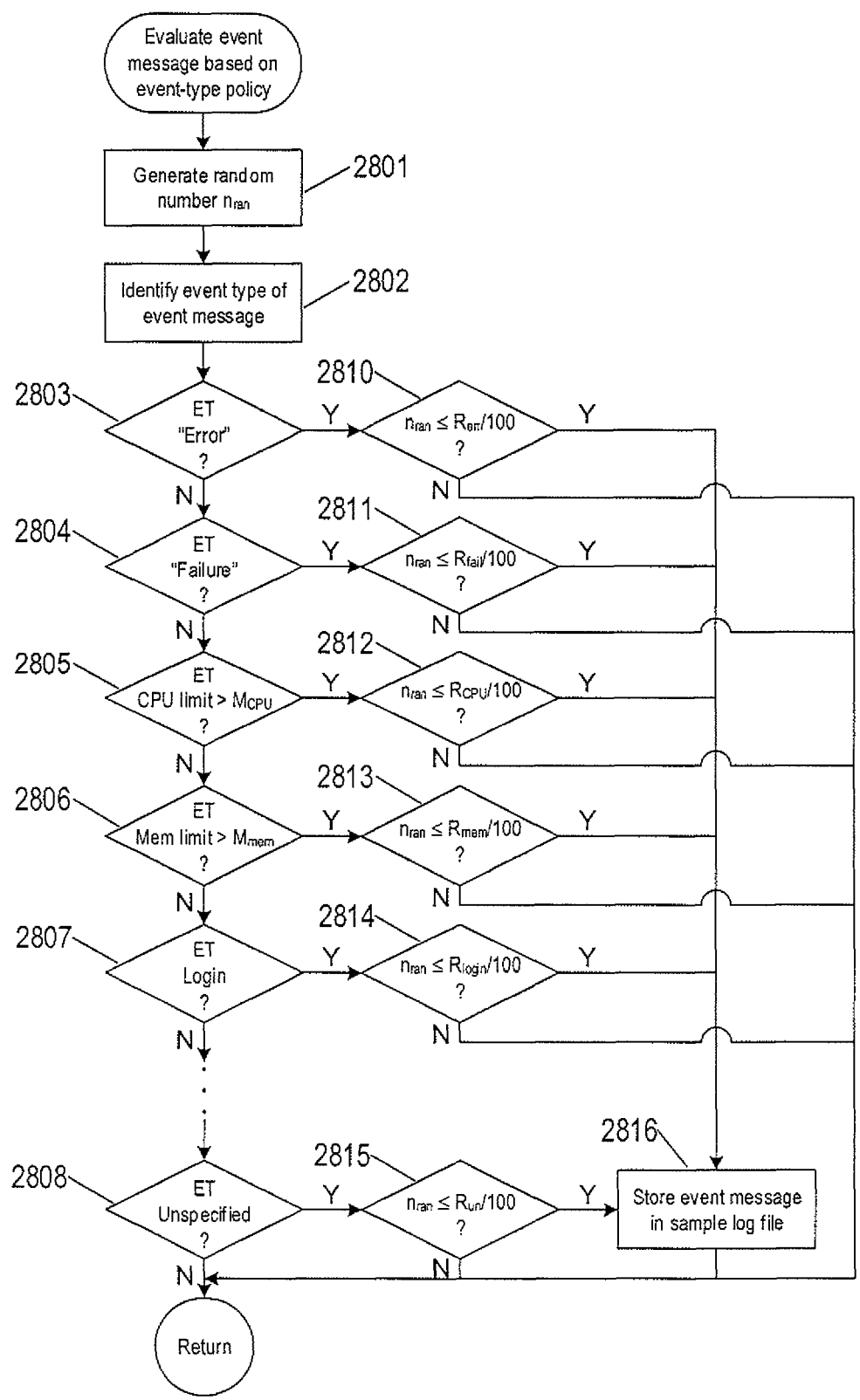
FIG. 28 shows a control-flow diagram of the method "evaluate event message based on event-type policy" called in FIG. 25.

FIG. 28 shows a control-flow diagram of the method "evaluate event message based on event-type policy" called in block 2507 of FIG. 25. In block 2801, a random number $n_{ran}$ is generated using a random number generator. In block 2802, the event type of the event is identified using event-type analysis described above with reference to FIG. 17. In decision blocks 2803-2809, when an event type of an event message is identified, control flows to corresponding decision blocks 2810-2815. In decision blocks 2810-2815, when the random number satisfies condition corresponding to the sample rate, control flows to block 2816. Otherwise, control flows to block 2817. In block 2816, the event message is written or stored in a sample log file, as described above with reference to FIGS. 22A-22F.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. In a process for sampling and querying event messages generated by various sources of event messages of a distributed computing system, the improvement comprising:
   temporarily storing each event message in a storage queue;
   displaying on a display screen of a computer system a graphical user interface that enables a user to set an event message policy for sampling a fraction of the event messages and storing copies of the fraction of sampled event messages in a sample log file;
   for each event message in the storage queue,
      storing the event message in an event-log file, and
      storing a copy of the event message in the sample log file when the event message satisfies the event message policy set by the user; and
   displaying event types of the event messages stored in the sample log file in the graphical user interface, thereby enabling a user to query the event messages stored in the sample log file to determine if a specific type of event message has been generated.

2. The process of claim 1, wherein the graphical user interface that enables the user to set the event message policy comprises enables the user to set a sample rate that represents a fraction of event messages that satisfy the event message policy to be stored in the sample log file.

3. The process of claim 1, wherein the graphical user interface that enables the user to set the event message policy comprises enables the user to set a plurality of sample rates, each sample rate corresponding to a different event type and representing a fraction of event messages having the same event type to be stored in the sample log file.

4. The process of claim 1, wherein storing the copy of the event message in the sample log file comprises:
   generating a random number;
   calculating a threshold based on the event message policy that represents a fraction of event messages to be stored in the sample log file; and
   when the random number is less than or equal to the threshold, storing the copy of the event message in the sample log file.

5. The process of claim 1, wherein storing the copy of the event message in the sample log file comprises:
   generating a random number; determining an event type of each event message using event-type analysis;
   displaying in the graphical user interface event types of the event messages and fields that enable a user to set a sample rate for each event type, each sample rate representing a fraction of event messages of the event type to be stored in the sample log file;
   calculating a threshold based on the sample rate; and
   when the random number is less than or equal to the threshold, storing the copy of the event message in the sample log file.

6. A computer system that samples and queries event messages generated by one or more sources of event messages of a distributed computing system, the computer system comprising:

one or more processors;
one or more data-storage devices; and
machine-readable instructions stored in the one or more data-storage devices that when executed using the one or more processors controls the system performs the operations comprising:
  temporarily storing the event messages in a storage queue;
  displaying on a display screen of the computer system a graphical user interface that enables a user to set an event message policy for sampling a fraction of the event messages and storing copies of the fraction of sampled event messages in a sample log file;
  for each event message in the storage queue,
    storing the event message in an event-log file, and
    storing a copy of the event message in the sample log file when the event message satisfies the event message policy set by the user; and
  displaying event types of the event messages stored in the sample log file in a graphical user interface that enables a user to query the event messages stored in the sample log file.

7. The computer system of claim 6, wherein the graphical user interface that enables the user to set the event message policy comprises enables the user to set a sample rate that represents a fraction of event messages that satisfy the event message policy to be stored in the sample log file.

8. The computer system of claim 6, wherein the graphical user interface that enables the user to set the event message policy comprises enables the user to set a plurality of sample rates, each sample rate corresponding to a different event type and representing a fraction of event messages having the same event type to be stored in the sample log file.

9. The computer system of claim 6, wherein storing the copy of the event message in the sample log file comprises:
  generating a random number;
  calculating a threshold based on the event message policy that represents a fraction of event messages to be stored in the sample log file; and
  when the random number is less than or equal to the threshold, storing the copy of the event message in the sample log file.

10. The computer system of claim 6, wherein storing the copy of the event message in the sample log file comprises:
  generating a random number;
  determining an event type of each event message using event-type analysis; displaying in the graphical user interface event types of the event messages and fields that enable a user to set a sample rate for each event type, each sample rate representing a fraction of event messages of the event type to be stored in the sample log file;
  calculating a threshold based on the sample rate; and
  when the random number is less than or equal to the threshold, storing the copy of the event message in the sample log file.

11. A non-transitory computer-readable medium encoded with machine-readable instructions that implement a method carried out by one or more processors of a computer system that performs the operations comprising:
  temporarily storing event messages generated by one or more sources of event messages of a distributed computing system in a storage queue;
  displaying on a display screen of the computer system a graphical user interface that enables a user to set an event message policy for sampling a fraction of the event messages and storing copies of the fraction of sampled event messages in a sample log file;
  for each event message in the storage queue,
    storing the event message in an event-log file, and
    storing a copy of the event message in the sample log file when the event message satisfies the event message policy set by the user; and
  displaying event types of the event messages stored in the sample log file in a graphical user interface that enables a user to query the event messages stored in the sample log file.

12. The medium of claim 11, wherein the graphical user interface that enables the user to set the event message policy comprises enables the user to set a sample rate that represents a fraction of event messages that satisfy the event message policy to be stored in the sample log file.

13. The medium of claim 11, wherein the graphical user interface that enables the user to set the event message policy comprises enables the user to set a plurality of sample rates, each sample rate corresponding to a different event type and representing a fraction of event messages having the same event type to be stored in the sample log file.

14. The medium of claim 11, wherein storing the copy of the event message in the sample log file comprises:
  generating a random number;
  calculating a threshold based on the event message policy that represents a fraction of event messages to be stored in the sample log file; and
  when the random number is less than or equal to the threshold, storing the copy of the event message hi the sample log file.

15. The medium of claim 11, wherein storing the copy of the event message in the sample log file comprises:
  generating a random number;
  determining an event type of each event message using event-type analysis;
  displaying in the graphical user interface event types of the event messages and fields that enable a user to set a sample rate for each event type, each sample rate representing a fraction of event messages of the event type to be stored in the sample log file;
  calculating a threshold based on the sample rate; and
  when the random number is less than or equal to the threshold, storing the copy of the event message in the sample log file.

* * * * *

UNITED STATES PATENT AND TRADEMARK OFFICE
CERTIFICATE OF CORRECTION

| | | |
|---|---|---|
| PATENT NO. | : 11,347,373 B2 | Page 1 of 1 |
| APPLICATION NO. | : 15/286366 | |
| DATED | : May 31, 2022 | |
| INVENTOR(S) | : Udi Wieder et al. | |

It is certified that error appears in the above-identified patent and that said Letters Patent is hereby corrected as shown below:

On the Title Page

Item (72), please add inventor:
-- Deep P. Desai, Seattle, WA (US) --

Signed and Sealed this
First Day of November, 2022

Katherine Kelly Vidal
*Director of the United States Patent and Trademark Office*